US011085825B2

United States Patent
Medhat et al.

(10) Patent No.: US 11,085,825 B2
(45) Date of Patent: Aug. 10, 2021

(54) SELF-REFERENCED SPECTROMETER

(71) Applicant: Si-Ware Systems, Cairo (EG)

(72) Inventors: Mostafa Medhat, Cairo (EG); Bassem Mortada, Nasr (EG); Yasser Sabry, Nasr (EG); Mohamed Hossam, Cairo (EG); Momen Anwar, Cairo (EG); Ahmed Shebl, Cairo (EG); Hisham Haddara, Nasr (EG); Bassam A. Saadany, Nasr (EG)

(73) Assignee: SI-WARE SYSTEMS, Cairo (EG)

( * ) Notice: Subject to any disclaimer, the term of this patent is extended or adjusted under 35 U.S.C. 154(b) by 89 days.

(21) Appl. No.: 16/368,771

(22) Filed: Mar. 28, 2019

(65) Prior Publication Data

US 2019/0301939 A1 Oct. 3, 2019

Related U.S. Application Data

(60) Provisional application No. 62/651,016, filed on Mar. 30, 2018.

(51) Int. Cl.
*G01J 3/45* (2006.01)
*G01J 3/02* (2006.01)
(Continued)

(52) U.S. Cl.
CPC .......... *G01J 3/45* (2013.01); *G01J 3/021* (2013.01); *G01J 3/0205* (2013.01);
(Continued)

(58) Field of Classification Search
CPC .... G01J 3/42; G01J 3/45; G01J 3/4532; G01J 3/4534; G01J 3/4535; G01J 2003/425; G01J 3002/4534; G01J 3/26
See application file for complete search history.

(56) References Cited

U.S. PATENT DOCUMENTS

| 3,915,573 A | 10/1975 | Knoll et al. |
| 4,444,501 A | 4/1984 | Schwiesow |

(Continued)

FOREIGN PATENT DOCUMENTS

| AT | 413241 B | 12/2005 |
| EP | 1058110 A1 | 12/2000 |

(Continued)

OTHER PUBLICATIONS

Invitation to Pay Additional Fees and Partial Search Report for PCT/US2019/025021, 18 pages, dated Jul. 29, 2019.
(Continued)

*Primary Examiner* — Michael A Lyons
(74) *Attorney, Agent, or Firm* — Loza & Loza, LLP; Holly L. Rudnick

(57) ABSTRACT

Aspects of the disclosure relate to a self-referenced spectrometer for providing simultaneous measurement of a background or reference spectral density and a sample or other spectral density. The self-referenced spectrometer includes an interferometer optically coupled to receive an input beam and to direct the input beam along a first optical path to produce a first interfering beam and a second optical path to produce a second interfering beam, where each interfering beam is produced prior to an output of the interferometer. The spectrometer further includes a detector optically coupled to simultaneously detect a first interference signal produced from the first interfering beam and a second interference signal produced from the second interfering beam, and a processor configured to process the first interference signal and the second interference signal and to utilize the second interference signal as a reference signal in processing the first interference signal.

30 Claims, 22 Drawing Sheets

(51) Int. Cl.
*G01J 3/10* (2006.01)
*G01J 3/42* (2006.01)
*G01J 3/453* (2006.01)
*G01J 3/26* (2006.01)

(52) U.S. Cl.
CPC .......... *G01J 3/0216* (2013.01); *G01J 3/0291* (2013.01); *G01J 3/0294* (2013.01); *G01J 3/0297* (2013.01); *G01J 3/10* (2013.01); *G01J 3/26* (2013.01); *G01J 3/42* (2013.01); *G01J 3/4532* (2013.01); *G01J 3/4535* (2013.01); *G01J 2003/425* (2013.01); *G01J 2003/4534* (2013.01)

(56) References Cited

U.S. PATENT DOCUMENTS

| | | |
|---|---|---|
| 4,538,910 A | 9/1985 | Doyle |
| 6,025,913 A | 2/2000 | Curbelo |
| 7,079,252 B1 | 7/2006 | Debreczeny et al. |
| 7,796,267 B2 | 9/2010 | Saadany et al. |
| 8,154,731 B2 | 4/2012 | Arnvidarson et al. |
| 8,736,843 B2 | 5/2014 | Medhat et al. |
| 8,922,787 B2 | 12/2014 | Mortada et al. |
| 10,151,633 B2 * | 12/2018 | O'Rourke .............. G01J 3/427 |
| 2002/0154379 A1 | 10/2002 | Tonar et al. |
| 2007/0291255 A1 * | 12/2007 | Larsen .................. G01J 3/02 356/73 |
| 2008/0228033 A1 | 9/2008 | Tumlinson et al. |
| 2008/0290279 A1 | 11/2008 | Juhl |
| 2011/0082353 A1 | 4/2011 | Kiesel et al. |
| 2012/0002212 A1 | 1/2012 | Chandler et al. |
| 2014/0098371 A1 | 4/2014 | Sabry et al. |
| 2014/0192365 A1 | 7/2014 | Mortada et al. |
| 2015/0062586 A1 | 3/2015 | Zhu et al. |
| 2015/0260573 A1 | 9/2015 | Ishimaru |
| 2015/0276588 A1 | 10/2015 | Marshall et al. |
| 2015/0323383 A1 * | 11/2015 | Pastore ................ G01J 3/28 356/326 |
| 2017/0363469 A1 | 12/2017 | Sabry et al. |
| 2020/0037883 A1 * | 2/2020 | Islam .................. G01J 3/453 |

FOREIGN PATENT DOCUMENTS

| | | |
|---|---|---|
| EP | 1931939 A1 | 6/2008 |
| EP | 2419770 B1 | 3/2013 |
| JP | 2017138390 A | 8/2017 |
| WO | 9838475 A1 | 9/1998 |

OTHER PUBLICATIONS

Hans Villemoes Andersen, Anders Friderichsen, Sønnik Clausen, and Jimmy Bak, "Comparison of noise sources in dual- and single-beam Fourier-transform near-infrared spectrometry", vol. 44, No. 29 Applied Optics 6, Oct. 10, 2005.

International Patent Application No. PCT/US2019/025021, International Search Report and Written Opinion, 37 pages (dated Nov. 4, 2019).

Elsayed, Ahmed A. et al. "Optical diffuse reflectance of Back Silicon and its isotropicity", 2016 URSI Asia-Pacific Radio Conference, IEEE, pp. 1944-1946 (Aug. 21, 2016).

International Patent Application No. PCT/US2019/025021, Written Opinion, 9 pages (dated Jul. 24, 2020).

\* cited by examiner

SELF-REFERENCED SPECTROMETER

PRIORITY CLAIM

This application claims priority to and the benefit of Provisional Application No. 62/651,016, filed in the U.S. Patent and Trademark Office on Mar. 30, 2018, the entire content of which is incorporated herein by reference as if fully set forth below in its entirety and for all applicable purposes.

TECHNICAL FIELD

The technology discussed below relates generally to spectrometers, and in particular to spectrometers for simultaneously capturing background or reference spectral density and sample spectral density.

BACKGROUND

Fourier Transform-Infrared (FT-IR) spectrometers measure a single-beam spectrum (power spectral density (PSD)), where the intensity of the single-beam spectrum is proportional to the power of the radiation reaching the detector. In order to measure the absorbance of a sample, the background spectrum (i.e., the single-beam spectrum in absence of a sample) should first be measured to compensate for the instrument transfer function. The single-beam spectrum of light transmitted or reflected from the sample may then be measured. The absorbance of the sample may be calculated from the transmittance or reflectance of the sample. For example, the absorbance of the sample may be calculated as the ratio of the spectrum of transmitted light or reflected light from the sample to the background spectrum.

For transmission measurements, the background spectrum may be obtained by measuring the spectrum of the beam at the input of the instrument without placing any material in the light path (e.g., an empty cuvette). For reflection measurements, the background spectrum may be obtained by placing a reference material with nearly flat spectral response across the spectral range of interest with greater than 95% reflectance instead of the sample. Background measurements should generally be performed under the same conditions at which the measurement of the sample is conducted.

To continue measuring accurate absorbance spectra, background measurements should be done frequently or even before each sample measurement, which consumes additional time. Spectroscopists have studied the frequency of background measurements and how the spectrum changes with temperature and time to attempt to derive models to simulate these effects and to determine how to compensate for them. Additional enhancements in spectrometer designs are desired to reduce the time in the measurement process, while maintaining an online reference/background measurement to compensate for any PSD drift effects.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure provide simultaneous measurement of a background or reference spectral density and a sample or other spectral density to maintain an online background/reference measurement, compensate for any PSD drift effects and minimize the time required to obtain the background/reference measurement and perform any PSD compensation. In an aspect of the disclosure, a self-referenced spectrometer includes an interferometer optically coupled to receive an input beam and to direct the input beam along a first optical path to produce a first interfering beam and a second optical path to produce a second interfering beam, where the first and second interfering beams are produced prior to an output of the interferometer. The spectrometer further includes a detector optically coupled to simultaneously detect a first interference signal produced from the first interfering beam and a second interference signal produced from the second interfering beam, and a processor coupled to the detector and configured to process the first interference signal and the second interference signal and to utilize the second interference signal as a reference signal in processing the first interference signal.

In an example, the interferometer may include a Michelson interferometer, a Mach-Zehnder interferometer, or a Fabry-Perot interferometer, which may be implemented within a Micro-Electro-Mechanical-Systems (MEMS) chip including a moveable mirror actuated by a MEMS actuator. In some examples, the interferometer may include retroreflectors and two outputs, where one output passes through a sample arm forming the first optical path and another output passes through a reference arm forming the second optical path. In other examples, a coupler may be implemented near an input of a Michelson interferometer to direct the reflected second interfering beam onto an input port corresponding to the second optical path. In still other examples, a sample-under-test (SUT) and a diffuse reflectance reference material or other reflection surface may be simultaneously illuminated and the reflected light from the SUT and the reference may be directed to the interferometer. In further examples, the second optical path may include a reference material with reference absorption peaks or a narrowband optical filter for continuous wavelength correction of the first interference signal and/or online mirror positioning. In still further examples, each optical path may simultaneously measure a different spectral range or resolution.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
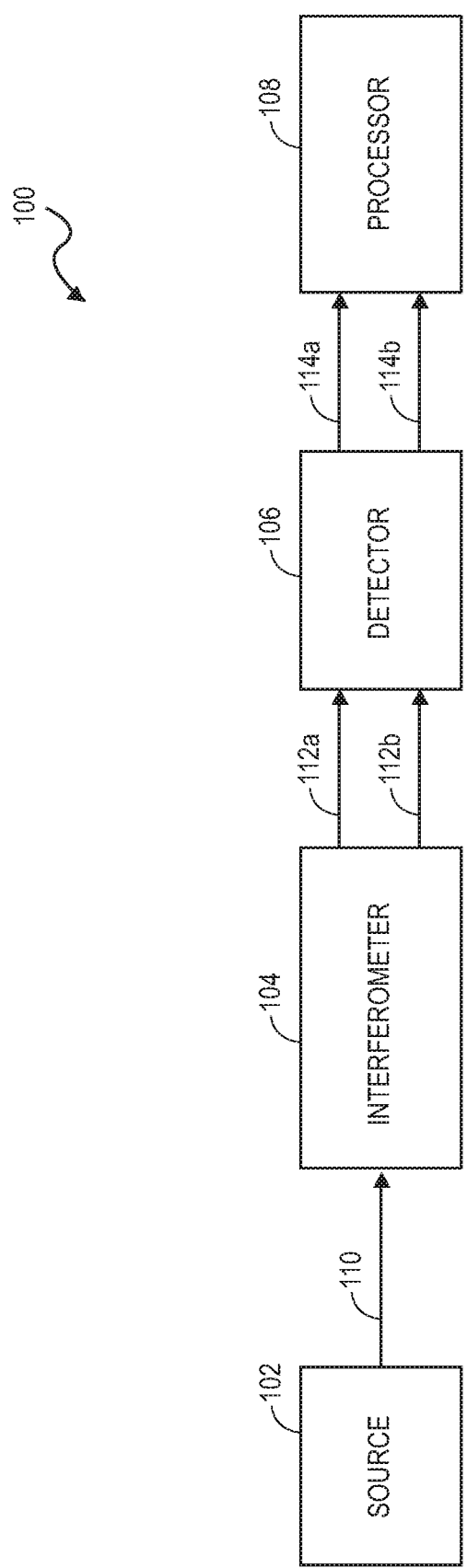
FIG. 1 is a diagram illustrating an example of a self-referenced spectrometer including an interferometer configured to simultaneously measure a background or reference power spectral density (PSD) and a sample or other PSD.

FIG. 1 illustrates an example of a self-referenced spectrometer 100 for simultaneously measuring a background or reference power spectral density (PSD) and a sample or other PSD. The spectrometer 100 includes a light source 102, an interferometer 104, a detector 106, and a processor 108. The light source 102 is configured to emit an input beam 110 and may include one or more wideband thermal radiation sources or a quantum source with an array of light emitting devices that cover the wavelength range of interest.

The interferometer 104 is optically coupled to receive the input beam 110 and to direct the input beam along one or more optical paths to produce two interfering beams 112a and 112b (e.g., interference patterns) at an output thereof. In some examples, the interfering beams 112a and 112b are produced within the interferometer 104 prior to the output thereof. One of the interfering beams 112a represents a sample or other spectrum, while the other interfering beam 112b represents a background or reference spectrum. Thus, each of the interfering beams 112a and 112b passes through a different respective medium (e.g., sample/other or background/reference) external to the interferometer 104. The interferometer 104 may include one or more Michelson interferometers, Mach-Zehnder (MZ) interferometers, and/or Fabry-Perot (FP) interferometers.

In addition, the interferometer 104 may be implemented on a Micro-Electro-Mechanical-Systems (MEMS) chip. As used herein, the term MEMS refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. One example of a MEMS element is a micro-optical component having a dielectric or metallized surface working in a reflection or refraction mode. Other examples of MEMS elements include actuators, detector grooves and fiber grooves.

In various aspects of the present disclosure, the MEMS interferometer 104 may include one or more micro-optical components (e.g., one or more reflectors or mirrors) that may be moveably controlled by a MEMS actuator. In some examples, the MEMS interferometer 104 may be fabricated using a Deep Reactive Ion Etching (DRIE) process on a Silicon On Insulator (SOI) wafer in order to produce the micro-optical components and other MEMS elements that are able to process free-space optical beams propagating parallel to the SOI substrate.

The detector 106 is optically coupled to receive the interfering beams 112a and 112b from the interferometer 104 and to simultaneously detect a first interference signal 114a produced from the first interfering beam 112a and a second interference signal 114b produced from the second interfering beam 112b. For example, each of the interference signals 114a and 114b may correspond to interferograms.

The processor 108 is configured to receive the first and second interference signals 114a and 114b and to use the second interference signal 114b as a reference signal in processing the first interference signal 114a. For example, the processor 108 may be configured to apply a Fourier Transform to each of the interference signals 114a and 114b to obtain the respective spectrums, and then to use the spectrum obtained from the second interference signal 114b in further processing of the spectrum obtained from the first interference signal 114a. In some examples, the processor 108 may calculate the absorbance of a sample-under-test (SUT) as a ratio of the spectrum obtained from the first interference signal 114a to the spectrum obtained from the second interference signal 114b.

The processor 108 may be a single processing device or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on hard coding of the circuitry and/or operational instructions. The processor 108 may have an associated memory and/or memory element, which may be a single memory device, a plurality of memory devices, and/or embedded circuitry of the processor. Such a memory device may be a read-only memory, random access memory, volatile memory, non-volatile memory, static memory, dynamic memory, flash memory, cache memory, and/or any device that stores digital information.

Figure 2:
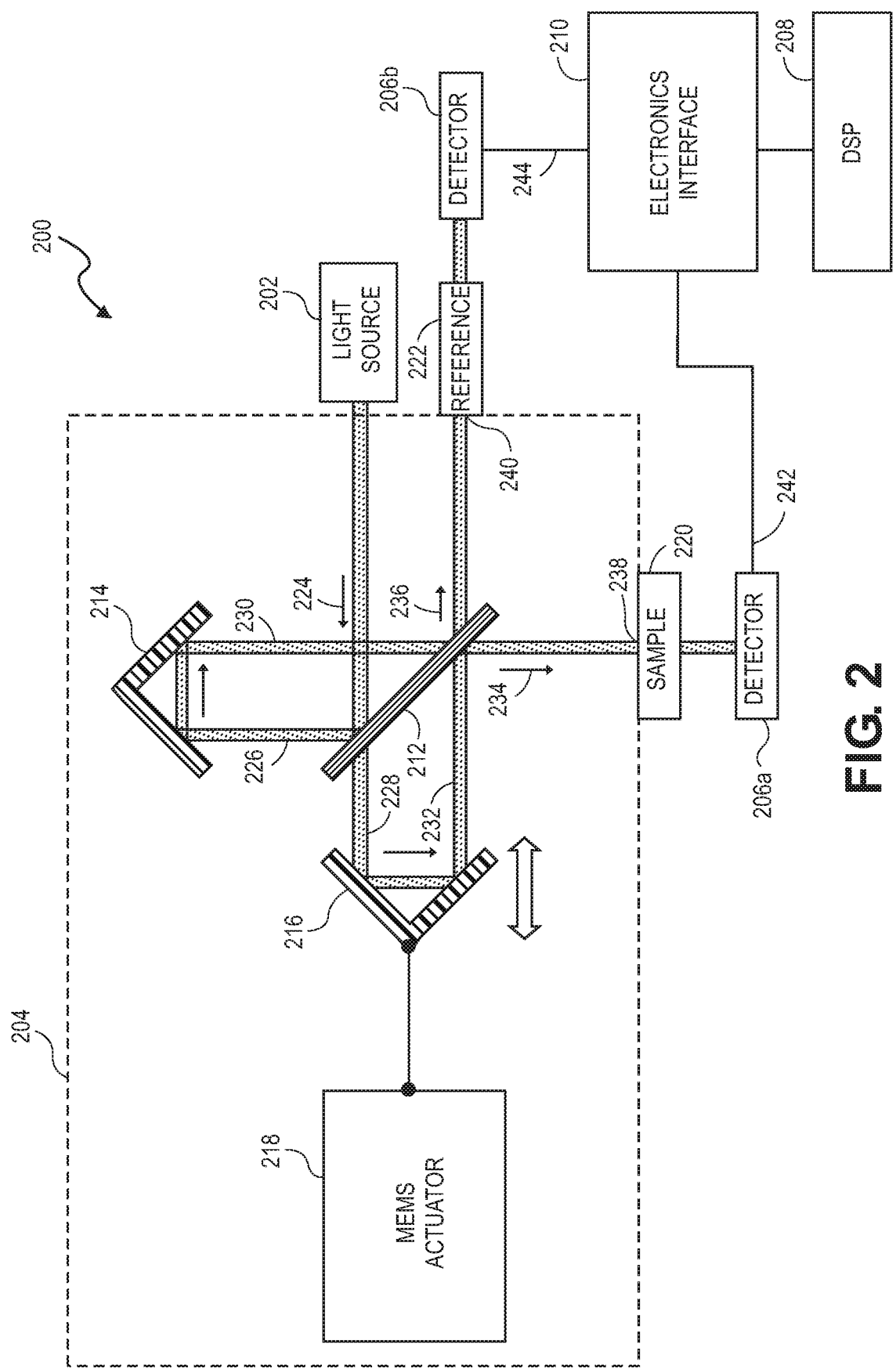
FIG. 2 is a diagram illustrating an example of a self-referenced spectrometer based on a Michelson interferometer including retro-reflectors.

FIG. 2 is a diagram illustrating an example of a self-referenced spectrometer 200. The spectrometer 200 includes a light source 202, an interferometer 204, detectors 206a and 206b, an electronics interface 210 and a digital signal processor (DSP) 208. The light source 202 may correspond, for example, to the light source 102 shown in FIG. 1. In addition, the interferometer 204, detectors 206a and 206b, and DSP 208 may correspond to the interferometer 104, detector 106, and processor 108, respectively, shown in FIG. 1.

The interferometer 204 is a Michelson interferometer fabricated on a MEMS chip that includes a beam splitter 212, a fixed reflector 214, a moveable reflector 216, and a MEMS actuator 218 coupled to the moveable reflector 216. The fixed reflector 214 and the moveable reflector 216 are each retro-reflectors. The beam splitter 212 may include, for example, an air-propagation based spatial splitter (e.g., a hollow waveguide splitter) or an air/silicon beam splitter (e.g., a beam splitter formed at an interface between silicon and air). The interferometer 204 includes two outputs 238 and 240, each optically coupled to one of two optical paths within the interferometer 204 and each further optically coupled to a respective detector 206a and 206b external to the interferometer 204. For example, a first optical path is formed between the beam splitter 212 and the first output 238, which then passes through a sample 220 (e.g., SUT) at the first output 238 towards the first detector 206a. A second optical path is formed between the beam splitter 212 and the second output 240, which then passes through a reference 222 at the second output 240 towards the second detector 206b.

In the example shown in FIG. 2, an input beam 224 from the light source 202 is split into two incident beams 226 and 228 by the beam splitter 212. The fixed retro-reflector 214 is optically coupled to receive a first incident beam 226 and to reflect the first incident beam 226 towards the beam splitter 212 to produce a first reflected beam 230. The moveable retro-reflector 216 is optically coupled to receive a second incident beam 228 and to reflect the second incident beam 228 towards the beam splitter 212 to produce a second reflected beam 232. The moveable retro-reflector 216 is coupled to the MEMS actuator 218 to produce a desired optical path difference (OPD) between the first and second reflected beams 230 and 232.

In one example, the MEMS actuator 218 is formed of a comb drive and spring. By applying a voltage to the comb drive, a potential difference results across the actuator 218, which induces a capacitance therein, causing a driving force to be generated as well as a restoring force from the spring, thereby causing a displacement of moveable retro-reflector 216 to the desired position for reflection of the incident beam 228. An OPD is then created between the reflected beams 230 and 232 that is substantially equal to twice the displacement of the moveable retro-reflector 216.

The reflected beams 230 and 232 interfere at the beam splitter 212, allowing the temporal coherence of the light to be measured at each different OPD produced by the moveable retro-reflector 216. The beam splitter 212 is further optically coupled to split the interference beam resulting from interference between the first reflected beam 230 and the second reflected beam 232 to produce a first interfering beam 234 and a second interfering beam 236. The beam splitter 212 is further optically coupled to direct the first interfering beam 234 along the first optical path (e.g., which may correspond to a sample arm of the interferometer 204) and the second interfering beam 236 along the second optical path (e.g., which may correspond to a reference arm of the interferometer 204).

The sample arm and the reference arm may each operate in either a transmission configuration or reflectance configuration (e.g., a diffuse reflectance configuration). In a transmission configuration, the interfering beam (e.g., beam 234 or 236) propagates through the sample 220 or reference 222 towards the respective detector 206a or 206b. In a reflectance configuration, the interfering beam (e.g., beam 234 or 236) is reflected from the sample 220 or reference 222 to the respective detector 206a or 206b. For the reference arm, in the case of a transmission configuration, the reference 222 may be an empty cuvette, while in the case of a reflectance configuration, the reference 222 may include Spectralon or polytetrafluoroethylene (PTFE) standard reflectors. For the sample arm, in the case of a transmission configuration, the interfering beam 234 may propagate through the sample 220, while in the case of a reflectance configuration, the interfering beam 234 may be reflected from the sample 220 towards the detector 206a.

Each detector 206a and 206b is optically coupled to receive the respective interfering beam 234 and 236 (e.g., after propagation through or reflection from the sample 220/reference 222) and to detect a respective interference signal 242 and 244. The electronics interface 210 is coupled to the detectors 206a and 206b to receive the interference signals 242 and 244 and is configured to process each of the interference signals 242 and 244 to extract the respective interferograms therefrom. The DSP 208 is coupled to the electronics interface 210 to receive the interferograms and is configured to calculate a sample absorbance $A_s$ as follows:

$$A_S = -\log_{10}\left(\frac{FFT|I_{d1}|}{FFT|I_{d2}|}\right) \quad \text{(Equation 1)}$$

where $I_{d1}$ is the detected interferogram signal from detector 206a and $I_{d2}$ is the detected interferogram signal from detector 206b. It should be understood that any differences between the two detectors 206a and 206b that may affect the accuracy of the sample absorbance may be calibrated and compensated in the final calculation.

Figure 3:
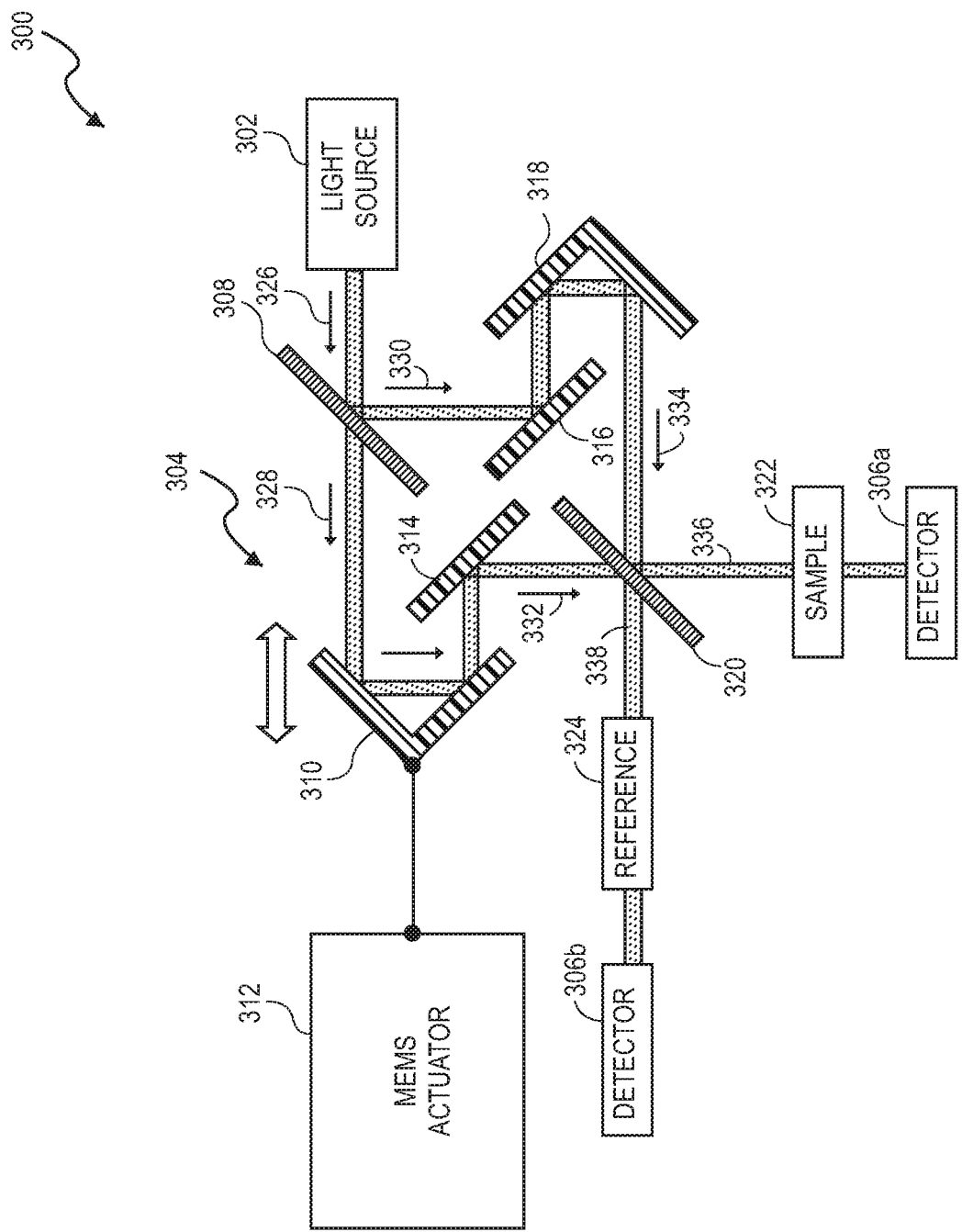
FIG. 3 is a diagram illustrating an example of a self-referenced spectrometer based on a Mach-Zehnder interferometer including retro-reflectors.

FIG. 3 is a diagram illustrating another example of a self-referenced spectrometer 300. The spectrometer 300 includes a light source 302, an interferometer 304 and detectors 306a and 306b. The light source 302 may correspond, for example, to the light source 102 shown in FIG. 1. In addition, the interferometer 304 and detectors 306a and 306b may correspond to the interferometer 104 and detector 106, respectively, shown in FIG. 1. In addition, the spectrometer 300 may further include a processor and/or other circuitry (not shown, for simplicity).

The interferometer 304 is a MZ interferometer fabricated on a MEMS chip that includes a first beam splitter 308, a moveable reflector 310, a MEMS actuator 312 coupled to the moveable reflector 310, a first flat mirror 314, a second flat mirror 316, a fixed reflector 318, and a second beam splitter 320. The fixed reflector 318 and the moveable reflector 310 are each retro-reflectors. The interferometer 304 includes two outputs, one passing through a sample 322 (e.g., a SUT) towards a detector 306a at a first output and another passing through a reference 324 towards a detector 306b at a second output. A first optical path is formed between the second beam splitter 320 and a first output of the interferometer 304 at the sample 322, whereas a second optical path is formed between the second beam splitter 320 and a second output of the interferometer 304 at the reference 324.

In the example shown in FIG. 3, an input beam 326 from the light source 302 is split into two incident beams 328 and 330 by the first beam splitter 308. The moveable retro-reflector 310 is optically coupled to receive a first incident beam 328 and to reflect the first incident beam 328 towards the second beam splitter 320 via the first flat mirror 314 to produce a first reflected beam 332. The second flat mirror 316 is optically coupled to direct a second incident beam 330 towards the fixed retro-reflector 318 for reflection thereof towards the second beam splitter 320 to produce a second reflected beam 334. The moveable retro-reflector 310 is coupled to the MEMS actuator 312 to produce a desired optical path difference (OPD) between the first and second reflected beams 332 and 334.

The reflected beams 332 and 334 interfere at the second beam splitter 320, allowing the temporal coherence of the light to be measured at each different OPD produced by the moveable retro-reflector 310. The second beam splitter 320 is further optically coupled to split the interference beam resulting from interference between the first reflected beam 332 and the second reflected beam 334 to produce a first interfering beam 336 and a second interfering beam 338. The second beam splitter 320 is further optically coupled to direct the first interfering beam 336 along the first optical path and the second interfering beam 338 along the second optical path.

Each detector 306a and 306b is optically coupled to receive the respective interfering beam 336 and 338 (e.g., after propagation through or reflection from the sample 322/reference 324) and to detect a respective interference signal. A processor (not shown) may then utilize the interference signal detected by detector 306b as a reference signal in processing the interference signal detected by detector 306a, as described above.

Figure 4:
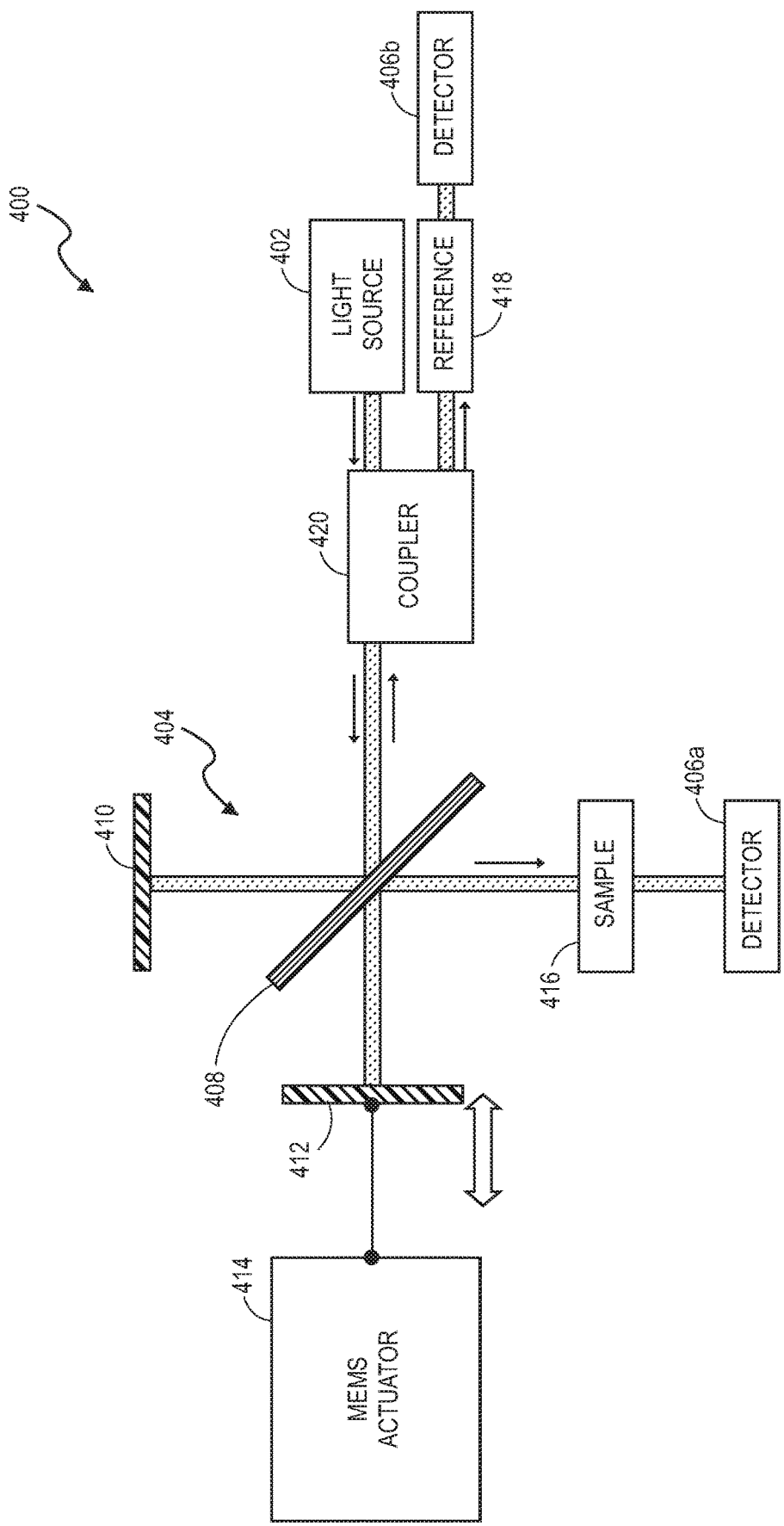
FIG. 4 is a diagram illustrating an example of a self-referenced spectrometer based on a Michelson interferometer including a coupler.

FIG. 4 is a diagram illustrating another example of a self-referenced spectrometer 400. The spectrometer 400 includes a light source 402, interferometer 404, and two detectors 406a and 406b. The light source 402 may correspond, for example, to the light source 102 shown in FIG. 1. In addition, the interferometer 404 and detectors 406a and 406b may correspond to the interferometer 104 and detector 106, respectively, shown in FIG. 1. In addition, the spectrometer 400 may further include a processor and/or other circuitry (not shown, for simplicity).

The interferometer 404 is a Michelson interferometer fabricated on a MEMS chip that includes a beam splitter 408, a fixed reflector 410 (e.g., a fixed mirror), a moveable reflector 412 (e.g., a moveable mirror), a MEMS actuator 414 coupled to the moveable reflector 412, and a coupler 420. The fixed reflector 410 and the moveable reflector 412 are each flat mirrors. The coupler 420 is positioned at an input of the interferometer 404. The interferometer 404 includes two outputs, one passing through a sample 416 (e.g., a SUT) towards a detector 406a and another passing back through the coupler 420 through a reference 418 towards a detector 406b. A first optical path is formed between the beam splitter 408 and a first output of the interferometer 404 at the sample 416, whereas a second optical path is formed between the beam splitter 408 and a second output of the interferometer 404 at the coupler 420/reference 418.

In the example shown in FIG. 4, an input beam from the light source 402 is coupled by the coupler 420 to the beam splitter 408, where the input beam is split into two incident beams. The fixed mirror 410 is optically coupled to receive one of the incident beams and to reflect the received incident beam back towards the beam splitter 408. The moveable mirror 412 is optically coupled to receive the other incident beam from the beam splitter 408 and to reflect the received incident beam back towards the beam splitter 408. The moveable mirror 412 is coupled to the MEMS actuator 414 to produce a desired optical path difference (OPD) between the beams reflected back to the beam splitter 408.

The reflected beams interfere at the beam splitter 408, allowing the temporal coherence of the light to be measured at each different OPD produced by the moveable mirror 412. The beam splitter 408 is further optically coupled to split the interference beam resulting from interference between the reflected beam to produce a two interfering beams, each directed along one of the first optical path or the second optical path. Each detector 406a and 406b is optically coupled to receive a respective one of the two interfering beams (e.g., after propagation through or reflection from the sample 416/reference 418) and to detect a respective interference signal. A processor (not shown) may then utilize the interference signal detected by detector 406b as a reference signal in processing the interference signal detected by detector 406a, as described above.

Figure 5:
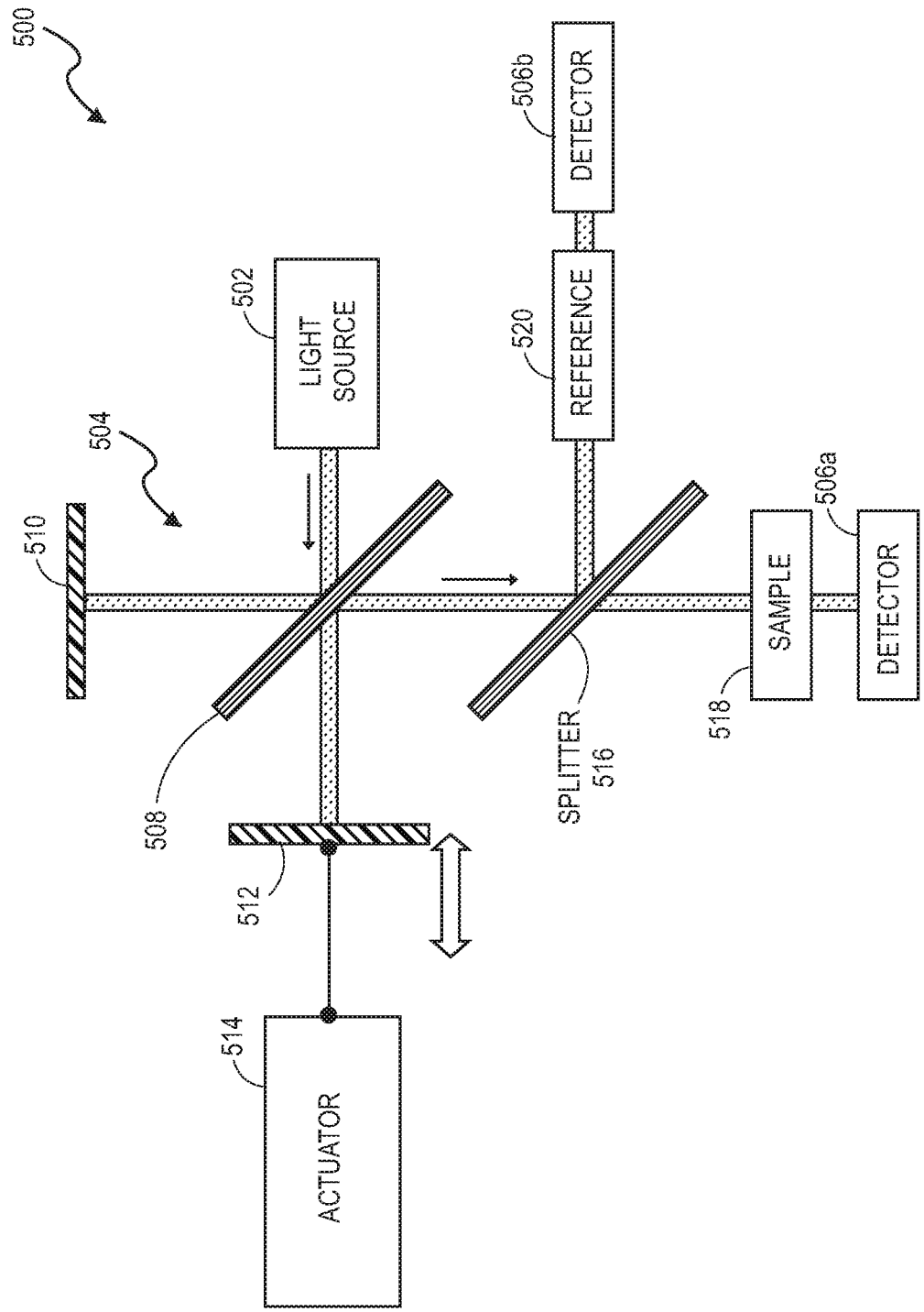
FIG. 5 is a diagram illustrating an example of a self-referenced spectrometer based on a Michelson interferometer and a splitter.

FIG. 5 is a diagram illustrating another example of a self-referenced spectrometer. The spectrometer 500 includes a light source 502, interferometer 504, and two detectors 506a and 506b. The light source 502 may correspond, for example, to the light source 102 shown in FIG. 1. In addition, the interferometer 504 and detectors 506a and 506b may correspond to the interferometer 104 and detector 106, respectively, shown in FIG. 1. In addition, the spectrometer 500 may further include a processor and/or other circuitry (not shown, for simplicity).

The interferometer 504 is a Michelson interferometer fabricated on a MEMS chip that includes a beam splitter 508, a fixed reflector 510 (e.g., a fixed mirror), a moveable reflector 512 (e.g., a moveable mirror), and a MEMS actuator 514 coupled to the moveable reflector 512. The fixed reflector 510 and the moveable reflector 512 are each flat mirrors. In the example shown in FIG. 5, the interferometer 504 includes a single output. The spectrometer 500 further includes an additional beam splitter 516 optically coupled to receive the output of the interferometer 504 (e.g., an interfering beam) and to split the output into the two interfering beams that may then each be directed towards one of a sample 518 or a reference 520. Each detector 506a and 506b is optically coupled to receive a respective one of the two interfering beams (e.g., after propagation through or reflection from the sample 518/reference 520) and to detect a respective interference signal. A processor (not shown) may then utilize the interference signal detected by detector 506b as a reference signal in processing the interference signal detected by detector 506a, as described above.

Figure 6:
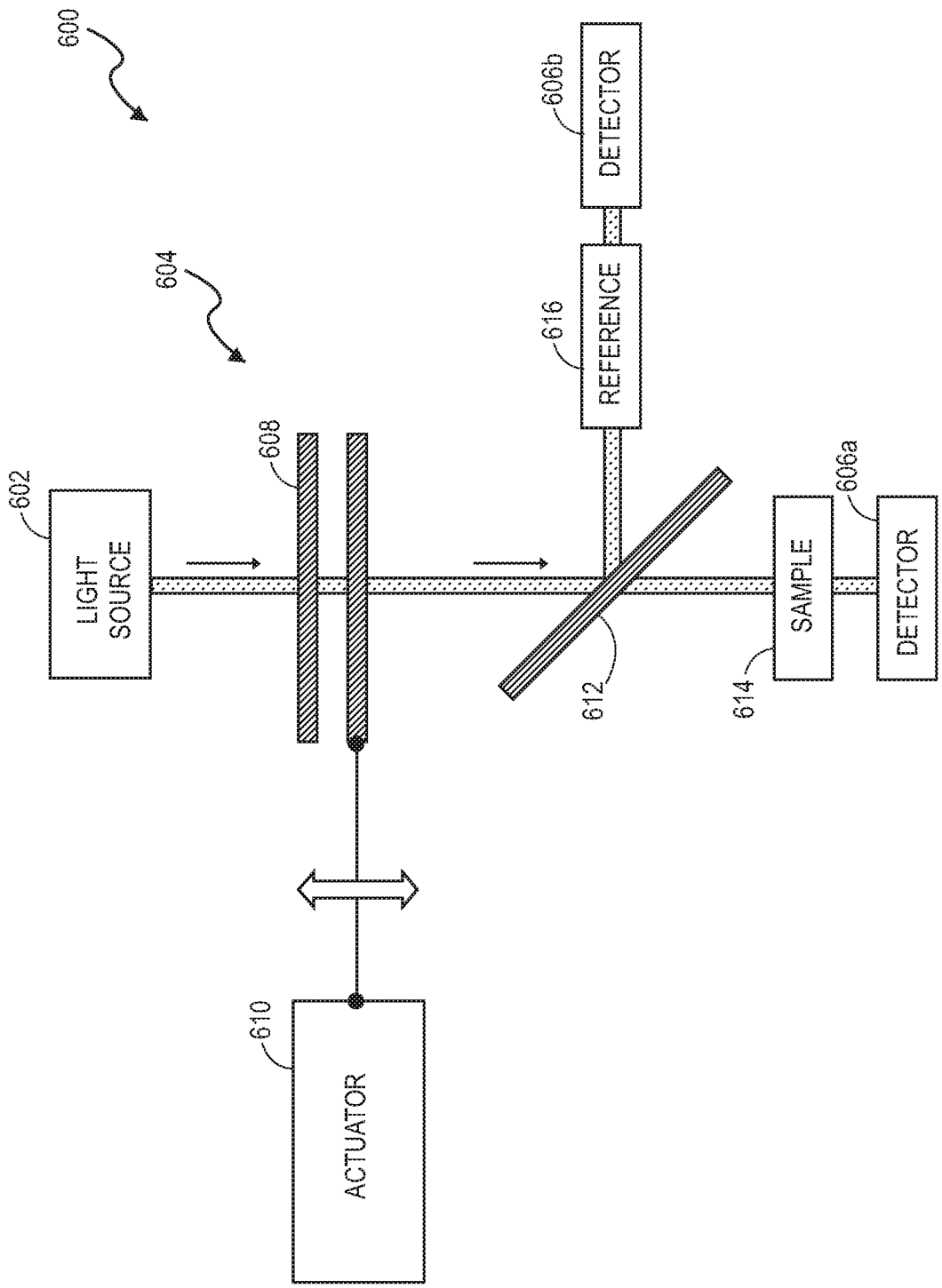
FIG. 6 is a diagram illustrating an example of a self-referenced spectrometer based on a Fabry-Perot interferometer and a splitter.

FIG. 6 is a diagram illustrating another example of a self-referenced spectrometer. The spectrometer 600 includes a light source 602, interferometer 604, and two detectors 606a and 606b. The light source 602 may correspond, for example, to the light source 102 shown in FIG. 1. In addition, the interferometer 604 and detectors 606a and 606b may correspond to the interferometer 104 and detector 106, respectively, shown in FIG. 1. In addition, the spectrometer 600 may further include a processor and/or other circuitry (not shown, for simplicity).

The interferometer 604 is a FP interferometer fabricated on a MEMS chip that includes a tunable FP filter 608 coupled to a MEMS actuator 610. The tunable FP filter 608 includes two slabs, one of which is coupled to the MEMS actuator 610. In an exemplary operation, the input beam from the light source 602 is transmitted through the top slab of the FP tunable filter 608 and enters a FP air cavity between the slabs, where the input beam is reflected multiple times off each of the interior reflecting surfaces of the slabs. The MEMS actuator 610 causes a displacement of the bottom slab, thus varying the width of the cavity, resulting in multiple offset beams that interfere with one another inside the FP air cavity. Part of the reflected light (interfering beam) is transmitted through the bottom slab each time the light reaches the slab, and is output by the interferometer 604.

In the example shown in FIG. 6, the interferometer 604 includes a single output. The spectrometer 600 further includes an additional beam splitter 612 optically coupled to receive the output of the interferometer 604 (e.g., an interfering beam) and to split the output into the two interfering beams that may then each be directed towards one of a sample 614 or a reference 616. Each detector 606a and 606b is optically coupled to receive a respective one of the two interfering beams (e.g., after propagation through or reflection from the sample 614/reference 616) and to detect a respective interference signal. A processor (not shown) may then utilize the interference signal detected by detector 606b as a reference signal in processing the interference signal detected by detector 606a, as described above.

Figure 7:
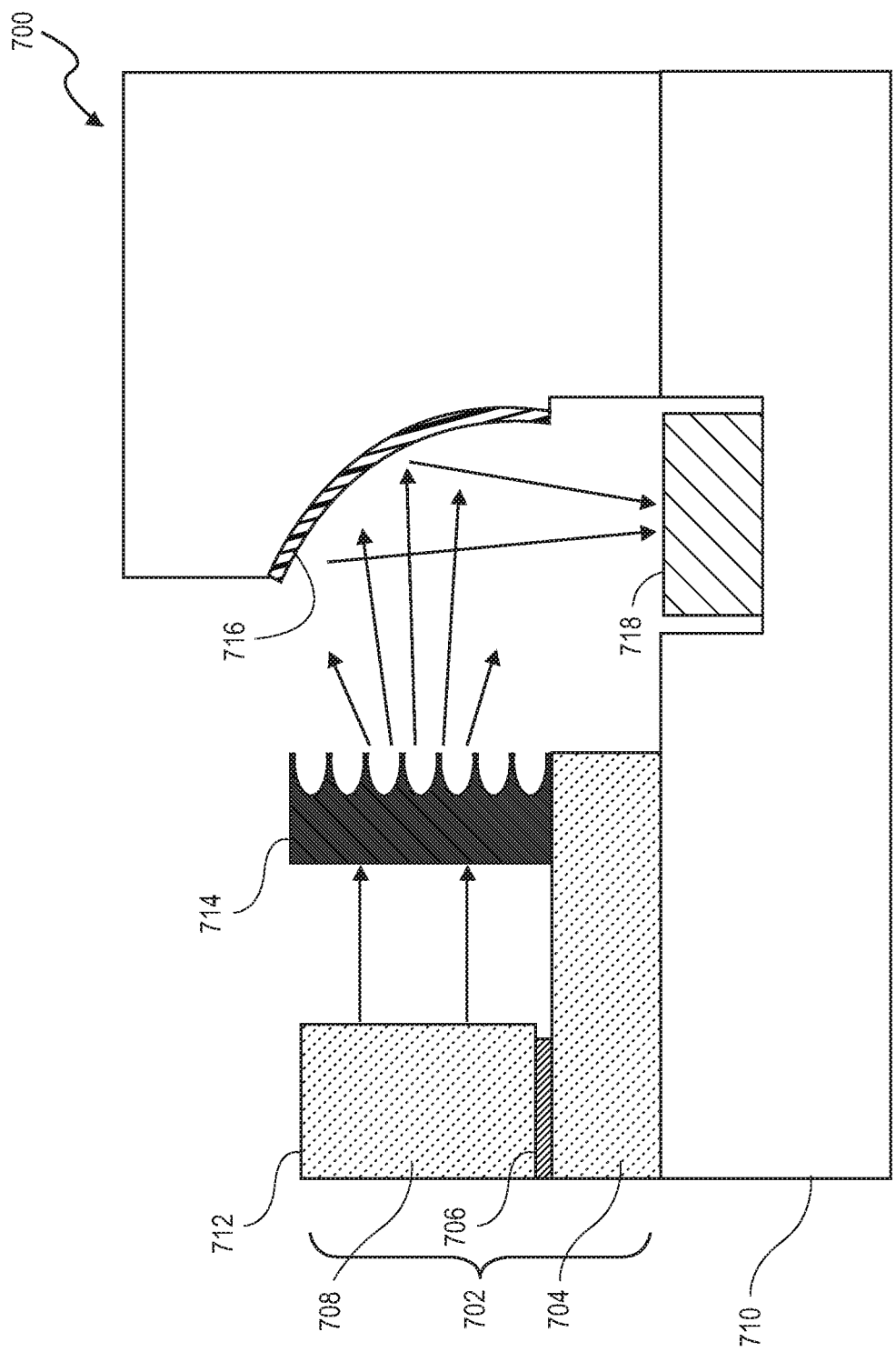
FIG. 7 is a diagram illustrating an example of a side view of a Micro-Electro-Mechanical-Systems (MEMS) chip including a self-referenced spectrometer and an integrated diffuse reflection reference material.

FIG. 7 is a diagram illustrating an example of a side view of a Micro-Electro-Mechanical-Systems (MEMS) chip 700 including various components of a self-referenced spectrometer. The MEMS chip 700 may be fabricated using a deep etching technology, such as Deep Reactive Ion Etching (DRIE), in a silicon-on-insulator (SOI) wafer 702 that includes a device layer 708, a handle layer 704, and a buried oxide (BOX) layer 706 sandwiched between the device layer 708 and the handle layer 704. Various components of the MEMS interferometer, such as a beam splitter 712, and other micro-optical components (e.g., mirrors, a MEMS actuator, etc.) may be defined using a single lithographic step and etched in the device layer 708 using a highly anisotropic process until the etch stop (BOX) layer 706 is reached. Any moveable parts, such as a moveable reflector and the MEMS actuator may be released by selectively removing the BOX layer 706 underneath the moveable parts. The MEMS chip 700 may further be wafer-level bonded to another substrate 710, such as a package.

The MEMS chip 700 may further include a diffuse reflection surface 714 forming the reference material for the MEMS interferometer and an integrated reflector 716, each fabricated monolithically within the MEMS chip. In the example shown in FIG. 7, the diffuse reflection surface 714 may include disordered silicon (e.g., black silicon). Black silicon is a needle-shaped surface structure, in which the surface of the structure includes a plurality of needles made of single-crystal silicon. In some examples, the needle diameters may be smaller than 1 micrometer and the needle heights may be larger than 10 micrometers, with a random variation of these parameters across the black silicon area. The needles may be formed in various shapes, such as spikes, columns, cones and pyramids, by etching without the use of a photolithographic mask. The diffuse reflection surface 714 may be coated with a metal to function as a high flux reference or with a dielectric to function as a low flux reference.

Using, for example, any of the self-referenced spectrometer configurations shown in FIGS. 2-6 above, an interfering beam from the beam splitter 712 may be directed towards the diffuse reflection surface 714, and the output thereof may be reflected by the integrated reflector 716 (e.g., which may be a curved reflector) towards a detector chip 718. The resulting interference signal detected by the detector chip 718 may be used as a reference signal in processing a sample interference signal, as described above.

Figure 8:
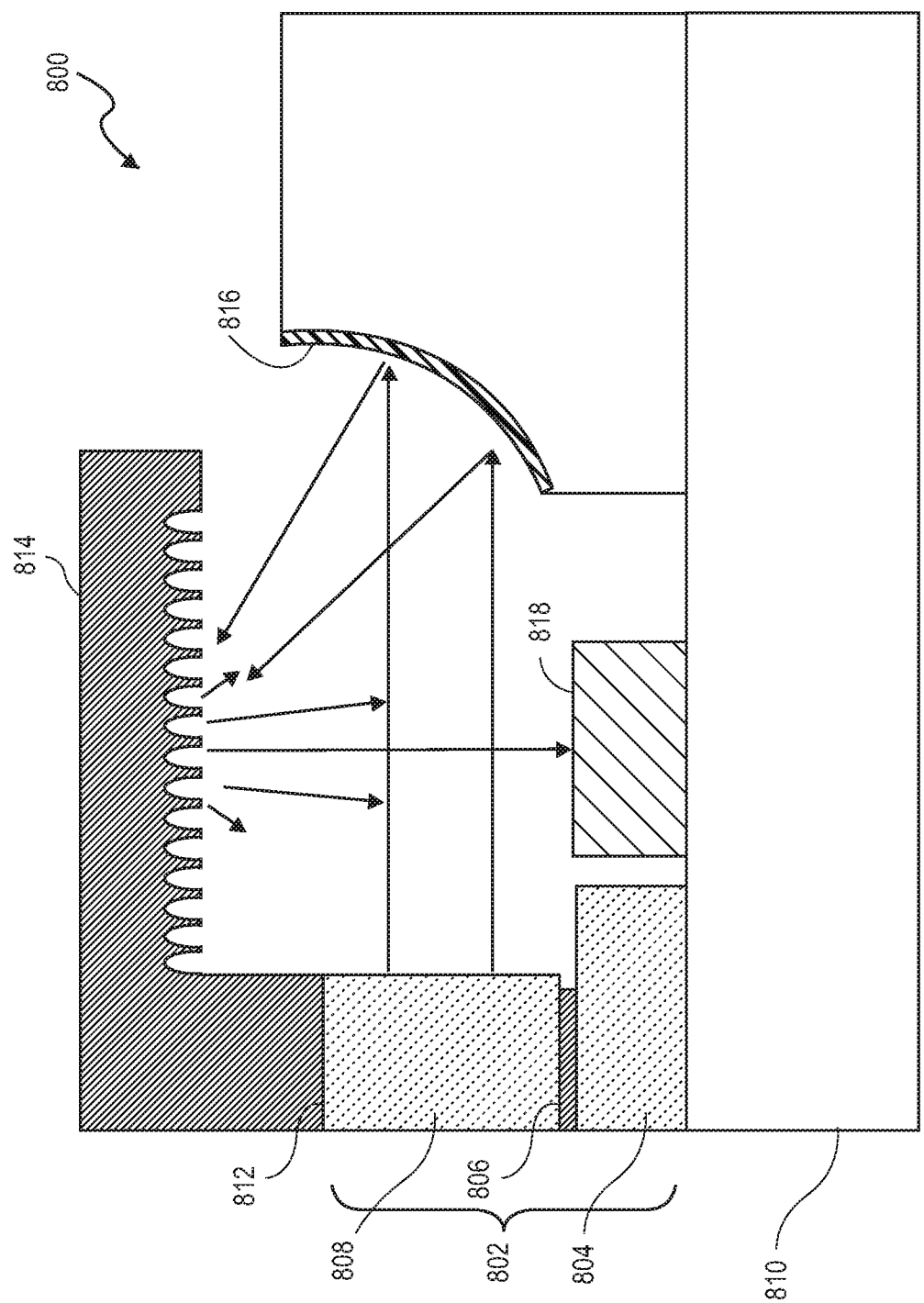
FIG. 8 is a diagram illustrating an example of a side view of a MEMS chip including a self-referenced spectrometer and a wafer-level bonded diffuse reflection reference material.

FIG. 8 is a diagram illustrating an example of a side view of a MEMS chip 800 including various components of a self-referenced spectrometer. The MEMS chip 800 may be fabricated using a deep etching technology, such as Deep Reactive Ion Etching (DRIE), in a silicon-on-insulator (SOI) wafer 802 that includes a device layer 808, a handle layer 804, and a buried oxide (BOX) layer 806 sandwiched between the device layer 808 and the handle layer 804. Various components of the MEMS interferometer, such as a beam splitter 812, and other micro-optical components (e.g., mirrors, a MEMS actuator, etc.) may be defined using a single lithographic step and etched in the device layer 808 using a highly anisotropic process until the etch stop (BOX) layer 806 is reached. Any moveable parts, such as a moveable reflector and the MEMS actuator may be released by selectively removing the BOX layer 806 underneath the moveable parts. The MEMS chip 800 may further be wafer-level bonded to another substrate 810, such as a package.

The MEMS chip 800 may further include an integrated reflector 816 fabricated monolithically within the MEMS chip. In addition, a diffuse reflection surface 814 may be wafer-level bonded to the MEMS chip 700. In the example shown in FIG. 8, the diffuse reflection surface 814 may include a sandblasted surface (e.g., glass). The diffuse reflection surface 814 may be coated with a metal to function as a high flux reference or with a dielectric to function as a low flux reference.

Using, for example, any of the self-referenced spectrometer configurations shown in FIGS. 2-6 above, an interfering beam from the beam splitter 812 may be directed towards the diffuse reflection surface 814 via the integrated reflector 816 (e.g., which may be a curved reflector), and the reflected beam from the diffuse reflection surface 814 may be reflected towards a detector chip 818. The resulting interference signal detected by the detector chip 818 may be used as a reference signal in processing a sample interference signal, as described above.

Figure 9:
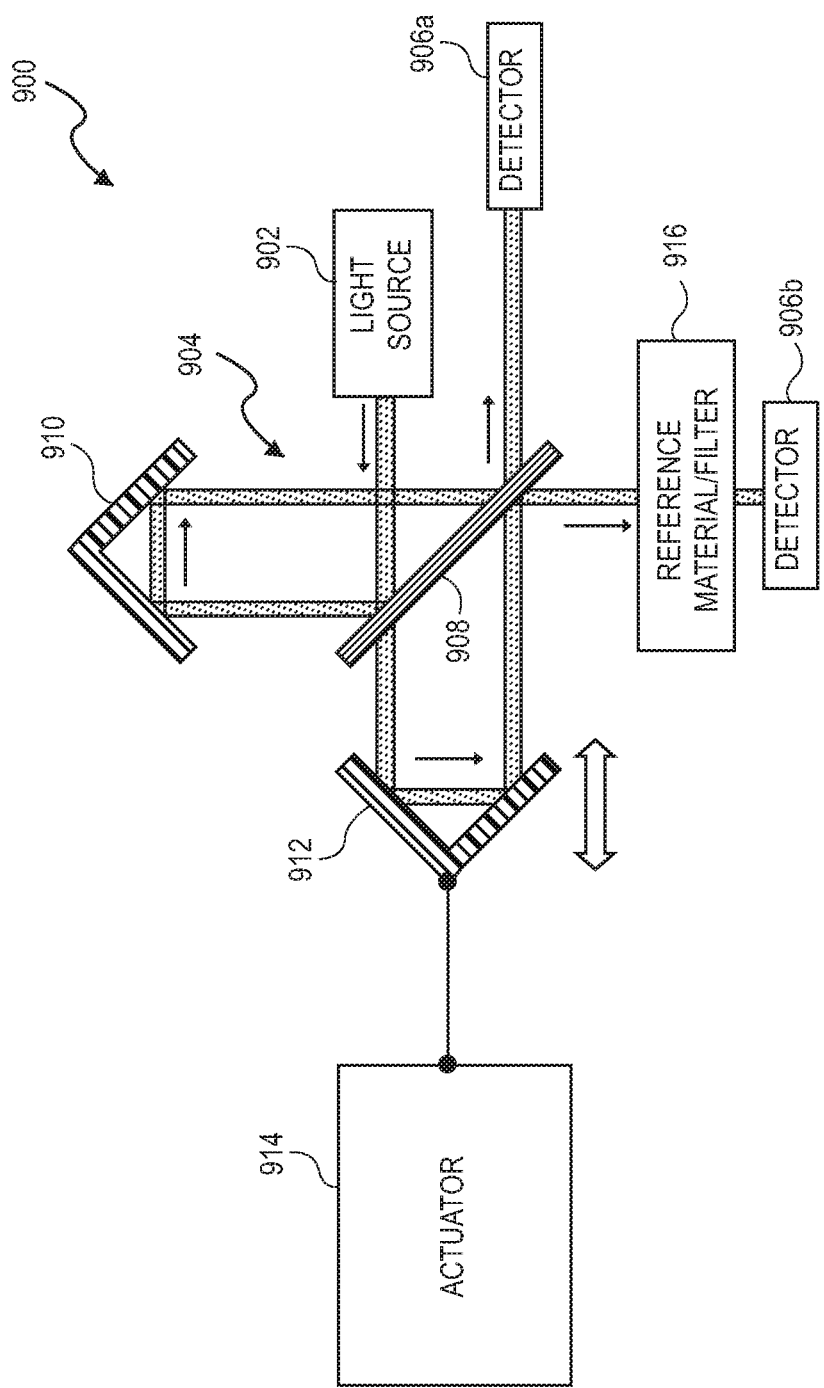
FIG. 9 is a diagram illustrating an example of a self-referenced spectrometer including a reference material or filter.

FIG. 9 is a diagram illustrating another example of a self-referenced spectrometer 900. The spectrometer 900 is similar to the spectrometer illustrated in FIG. 2 in that the spectrometer 900 includes a light source 902, a Michelson interferometer 904 (including a beam splitter 908, a fixed retro-reflector 910, a moveable retro-reflector 912 and a MEMS actuator 914 coupled to the moveable retro-reflector 912), and two detectors 906a and 906b. The interferometer 904 further includes two outputs, one passing directly towards a detector 906a and another passing through a reference material or optical filter 916 at the output towards a detector 906b. Thus, a first optical path is formed between the beam splitter 908 and the first output of the interferometer 904 towards the first detector 906a, whereas a second optical path is formed between the beam splitter 908 and the second output of the interferometer 904 at the reference material or optical filter 916.

In some examples, the interference signal from the reference material or optical filter 916 with reference absorption peaks detected by the detector 906b may be utilized by a processor (not shown) for continuous wavelength correction of the interference signal detected by the detector 906a. In addition, in examples in which a narrowband optical filter 916 is incorporated into the spectrometer 900, the narrowband optical filter 916 may also be utilized for online mirror positioning of the moveable reflector 912. For example, the detected interferogram from the detector 906b may be in the form of a sinusoidal signal of a period corresponding to the central wavelength $\lambda_o$ of the filter 916. More particularly, one cycle of the detected interferogram signal may correspond to an OPD (equal to $\lambda_o$) between the reflected beams reflected back to the splitter 908 from the fixed retro-reflector 910 and the moveable retro-reflector 912 resulting from the displacement of the moveable retro-reflector 912.

Figure 10:
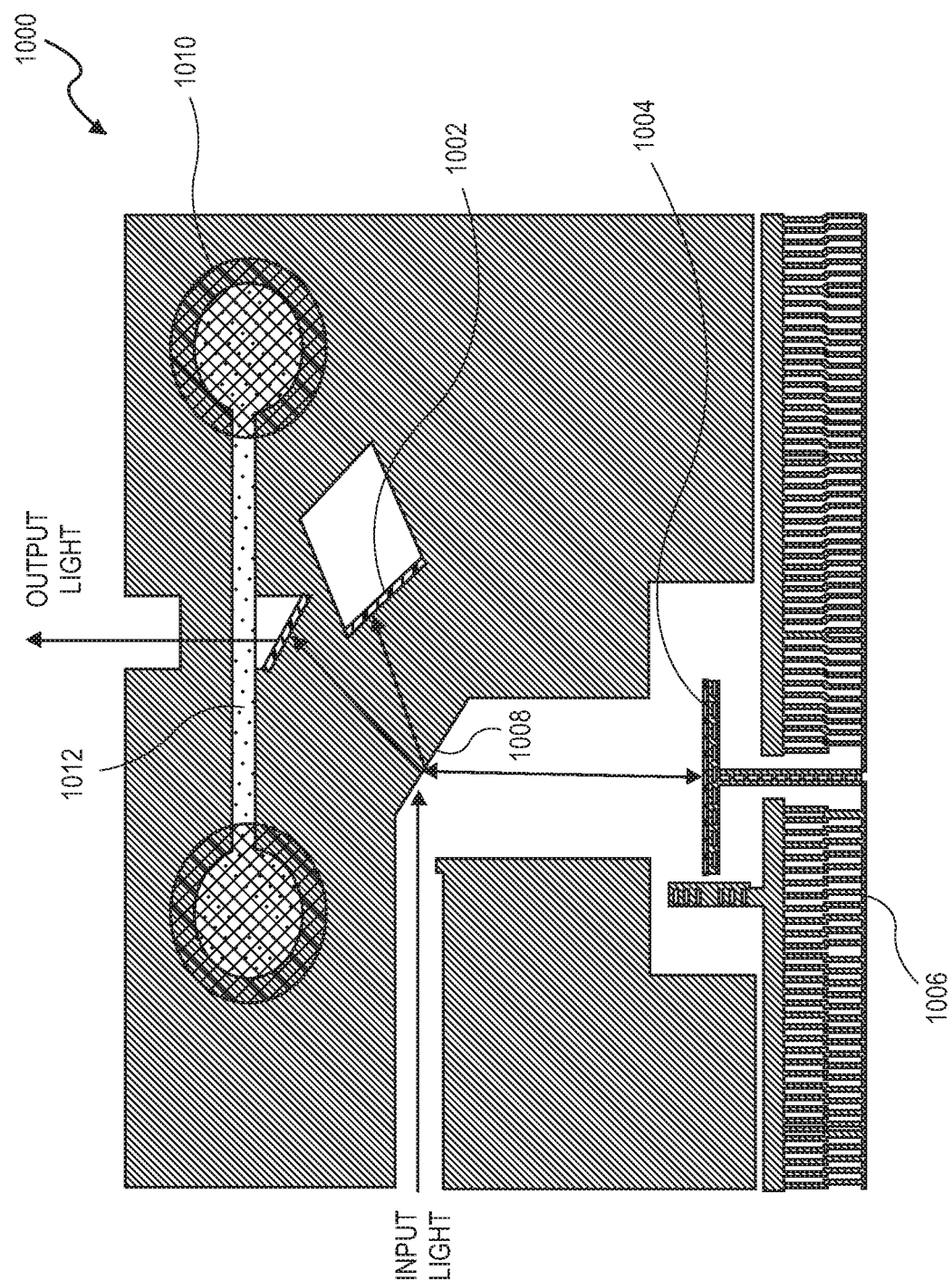
FIG. 10 is a diagram illustrating an example of a top view of a MEMS interferometer chip with an integrated liquid or gas reference material in a microfluidic channel.

FIG. 10 is a diagram illustrating an example of a top view of a MEMS interferometer chip 1000. The MEMS interferometer chip 1000 may be fabricated, for example, using DRIE in a silicon-on-insulator (SOI) wafer. The MEMS interferometer chip 1000 includes a fixed mirror 1002, a moveable mirror 1004 coupled to a MEMS actuator 1006, a beam splitter 1008 formed at the interface between silicon and air, and a microfluidic channel or connector 1010 integrated within the MEMS interferometer chip 1000. The microfluidic channel 1010 may include a reference material 1012 formed of a liquid or gas. With knowledge of the reference wavelength position of certain absorption peaks, the wavelength axis of the output of the MEMS interferometer chip 1000 may be corrected.

In this example, the interfering beam produced at the output of the interferometer includes a combined interfering beam including both a first interfering beam produced as a result of passing through the mirrors 1002 and 1004 and beam splitter 1008 (e.g., the first optical path) and a second interfering beam produced as a result of passing through the mirrors 1002/1004, beam splitter 1008, and reference material 1012 (e.g., the second optical path). Thus, a single detector may be utilized to detect a single interference signal that includes both the first interference signal (e.g., the sample or other signal) and the second interference signal (e.g., the reference signal). In the example in FIG. 10, the light is transmitted through the reference liquid or gas at the output of the interferometer. However, in other examples, the light may be transmitted through the reference liquid or gas at the input of the interferometer.

Figure 11:
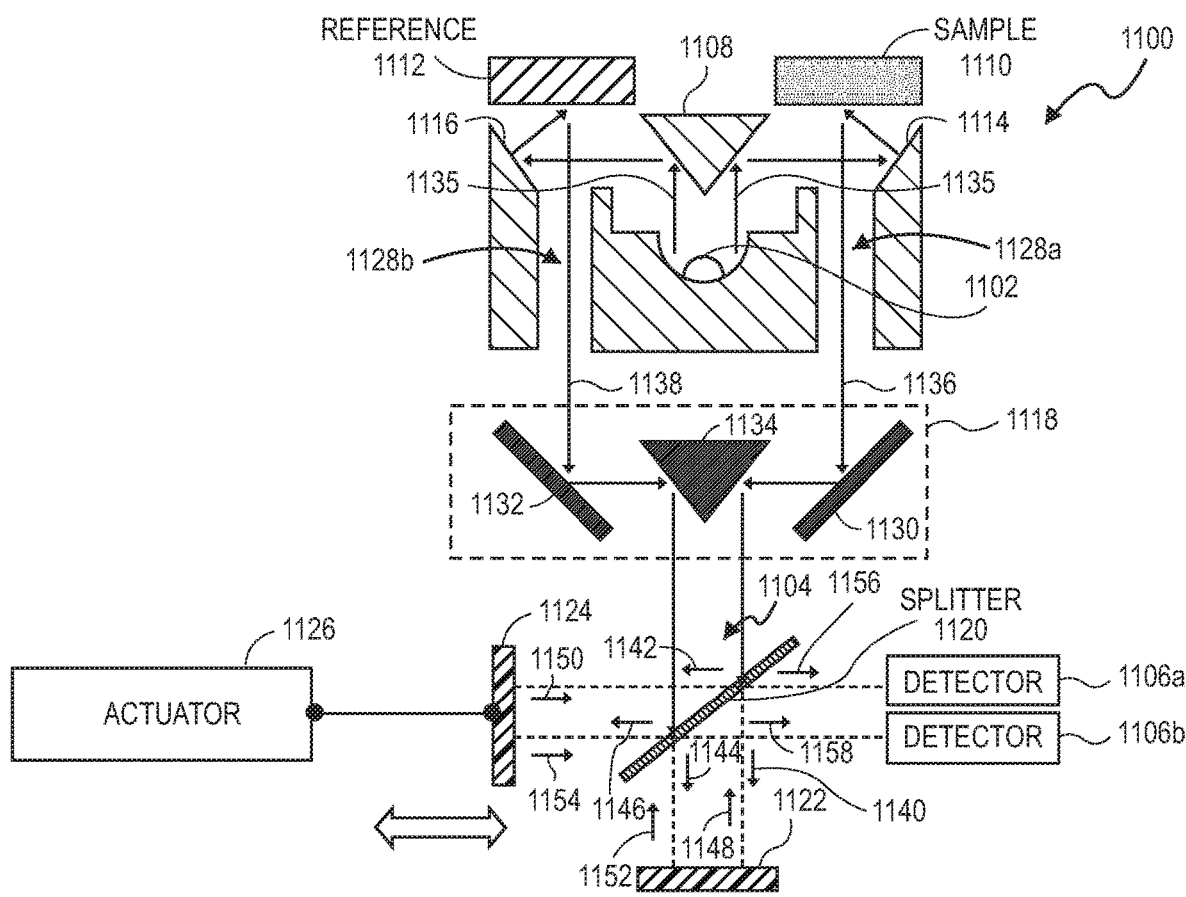
FIG. 11 is a diagram illustrating an example of a self-referenced spectrometer based on a Michelson interferometer and including optical components designed to simultaneously illuminate a reference material and sample-under-test (SUT) and to direct the reflected light to the interferometer.

FIG. 11 is a diagram illustrating another example of a self-referenced spectrometer 1100. The spectrometer 1100 includes a light source 1102, interferometer 1104, and two detectors 1106a and 1106b. The light source 1102 may correspond, for example, to the light source 102 shown in FIG. 1. In addition, the interferometer 1104 and detectors 1106a and 1106b may correspond to the interferometer 104 and detector 106, respectively, shown in FIG. 1. In addition, the spectrometer 1100 may further include a processor and/or other circuitry (not shown, for simplicity).

The spectrometer 1100 further includes optical components designed to simultaneously illuminate a sample (e.g., a SUT) 1110 and a reference (e.g., a diffuse reflectance surface) 1112. In the example shown in FIG. 11, the spectrometer 1100 includes a splitter 1108 optically coupled to split an original source beam 1105 emitted from the light source 1102 into a first source beam reflected by a first reflective surface 1114 towards the sample 1110 and a second source beam reflected by a second reflective surface 1116 towards the reference 1112. Light reflected from the sample 1110 and the reference 1112 may be directed towards a respective input of the interferometer 1104 as first and second input beams 1136 and 1138, respectively, via, for example, one or more waveguides 1128a and 1128b and/or other additional optical components 1118. For example, the additional optical components 1118 may include a first flat mirror 1130 optically coupled to receive the first input beam 1136 reflected from the sample 1110 and a second flat mirror 1132 optically coupled to receive the second input beam 1138 reflected from the reference 1112. The first and second input beams reflected from the flat mirrors 1130 and 1132 may then be directed towards a reflective element 1134 optically coupled to direct the first and second input beams 1136 and 1138, respectively, into the interferometer 1104.

The interferometer 1104 is a Michelson interferometer that includes a beam splitter 1120, a fixed reflector 1122 (e.g., a fixed mirror), a moveable reflector 1124 (e.g., a moveable mirror), and a MEMS actuator 1126 coupled to the moveable reflector 1124. The fixed mirror 1122 and the moveable mirror 1124 are each flat mirrors. In the example shown in FIG. 11, the first and second input beams 1136 and 1138, respectively, are each input to the beam splitter 1120, which is optically coupled to split each of the input beams into respective incident beams. For example, the beam splitter 1120 may split the first input beam 1136 reflected from sample 1110 into a first incident beam 1140 and a second incident beam 1142 and may direct the first incident beam 1140 towards the fixed mirror 1122 and the second incident beam 1142 towards the moveable mirror 1124. In addition, the beam splitter 1120 may split the second input beam 1138 reflected from the reference 1112 into a third incident beam 1144 and a fourth incident beam 1146 and direct the third incident beam 1144 towards the fixed mirror 1122 and the fourth incident beam 1146 towards the moveable mirror 1124.

The fixed mirror 1122 is optically coupled to reflect the received first and third incident beams 1140 and 1144, respectively back towards the beam splitter 1120 as first and third reflected beams 1148 and 1152, respectively. The moveable mirror 1124 is optically coupled to reflect the received second and fourth incident beams 1142 and 1146, respectively, back towards the beam splitter 1120 as second and fourth reflected beams 1150 and 1154, respectively. The moveable mirror 1124 is coupled to the MEMS actuator 1126 to produce a desired respective optical path difference (OPD) between the first and third reflected beams and the second and fourth reflected beams.

The first and second reflected beams 1148 and 1150, respectively, interfere at the beam splitter 1120 to produce a first interfering beam 1156, whereas the third and fourth reflected beams 1152 and 1154, respectively, interfere at the beam splitter 1120 to produce a second interfering beam 1158. The beam splitter 1120 is further optically coupled to direct the first interfering beam 1156 towards detector 1106a to detect a first interference signal and the second interfering beam 1158 towards detector 1106b to detect a second interference signal. A processor (not shown) may then utilize the interference signal detected by detector 1106b as a reference signal in processing the interference signal detected by detector 1106a, as described above. In this example, a first optical path is formed between a first input of the interferometer 1104 optically coupled to receive the first input beam 1136 reflected from the sample 1110 and a first output thereof directing the first interfering beam 1156 towards the first detector 1106a, whereas a second optical path is formed between a second input of the interferometer 1104 optically coupled to receive the second input beam 1138 reflected from the reference 1112 and a second output thereof directing the second interfering beam 1158 towards the second detector 1106b.

In some examples, the interferometer 1104, splitter, 1108, reflective surfaces 1114 and 1116 and additional optical components 1118 may be fabricated monolithically on a MEMS chip. In addition, it should be understood that other optical components may be utilized to direct the original input beam towards the sample 1110 and the reference 1112 and to direct the reflected input beams from the sample 1110 and the reference 1112 into the interferometer 1104.

Figure 12:
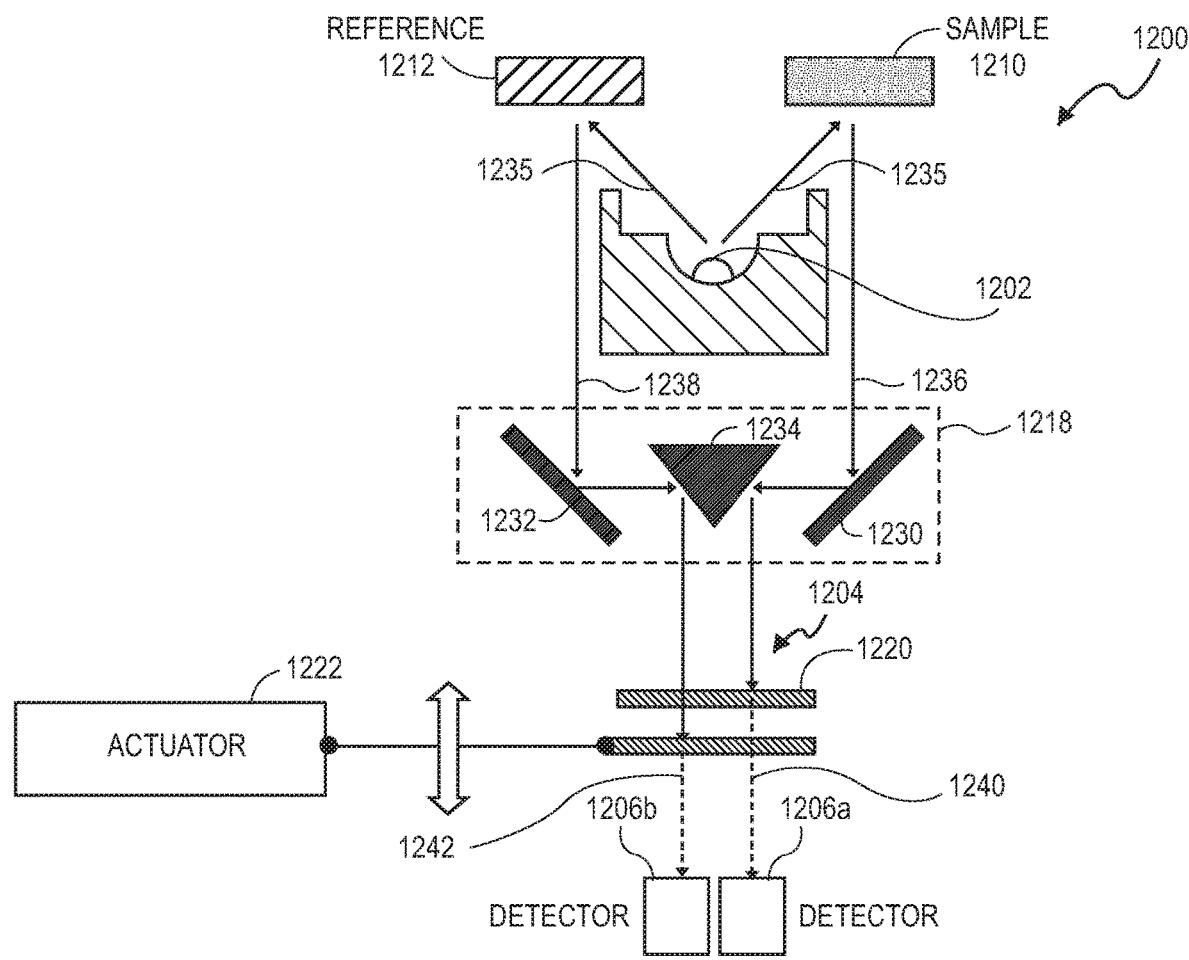
FIG. 12 is a diagram illustrating an example of a self-referenced spectrometer based on a Fabry-Perot interferometer and including optical components designed to simultaneously illuminate a reference material and sample-under-test (SUT) and to direct the reflected light to the interferometer.

FIG. 12 is a diagram illustrating another example of a self-referenced spectrometer. The spectrometer 1200 includes a light source 1202, interferometer 1204, and two detectors 1206a and 1206b. The light source 1202 may correspond, for example, to the light source 102 shown in FIG. 1. In addition, the interferometer 1204 and detectors 1206a and 1206b may correspond to the interferometer 104 and detector 106, respectively, shown in FIG. 1. In addition, the spectrometer 1200 may further include a processor and/or other circuitry (not shown, for simplicity).

The spectrometer 1200 is configured to simultaneously illuminate a sample (e.g., a SUT) 1210 and a reference (e.g., a diffuse reflectance surface) 1212. In the example shown in FIG. 12, a source beam 1235 output from the light source 1202 is directed towards both the sample 1210 and the reference 1212. Light reflected from the sample 1210 and the reference 1212 may be directed towards a respective input of the interferometer 1204 as input beams 1236 and 1238, respectively, via, for example, additional optical components 1218. For example, the additional optical components 1218 may include a first flat mirror 1230 optically coupled to receive the first input beam reflected from the sample 1210 and a second flat mirror 1232 optically coupled to receive the second input beam reflected from the reference 1212. The first and second input beams reflected from the flat mirrors 1230 and 1232 may then be directed towards a reflective element 1234 optically coupled to direct the first and second input beams 1236 and 1238, respectively, into the interferometer 1204.

The interferometer 1204 is a FP interferometer that includes a tunable FP filter 1220 coupled to a MEMS actuator 1222. The tunable FP filter 1220 includes two slabs, one of which is coupled to the MEMS actuator 1222. In an exemplary operation, the first and second input beams 1236 and 1238, respectively, reflected from the sample 1210 and the reference 1212 are transmitted through the top slab of the FP tunable filter 1220 and enter a FP air cavity between the slabs, where the input beams are reflected multiple times off each of the interior reflecting surfaces of the slabs. The MEMS actuator 1222 causes a displacement of the bottom slab, thus varying the width of the cavity, resulting in multiple offset beams that interfere with one another inside the FP air cavity. Part of the reflected light associated with each of a first interfering beam 1240 and a second interfering beam 1242 is transmitted through the bottom slab each time the light reaches the slab towards the respective detectors 1206a and 1206b.

A processor (not shown) may then utilize the interference signal detected by detector 1206b as a reference signal in processing the interference signal detected by detector 1206a, as described above. In this example, a first optical path is formed between a first input of the interferometer 1204 optically coupled to receive the input beam 1236 reflected from the sample 1210 and a first output of the interferometer 1204 coupled to provide the first interfering beam 1240 to the first detector 1206a, whereas a second optical path is formed between a second input of the interferometer 1204 optically coupled to receive the input beam 1238 reflected from the reference 1212 and a second output of the interferometer 1204 coupled to provide the second interfering beam 1242 to the second detector 1206b.

It should be understood that the optical components illustrated in FIG. 12 are merely exemplary and other optical components (e.g., such as the optical components shown in FIG. 11) may be utilized to direct the light from the light source 1202 to the sample 1210 and the reference 1212 and to direct the reflected input beams from the sample 1210 and the reference 1212 into the interferometer 1204.

Figure 13A:
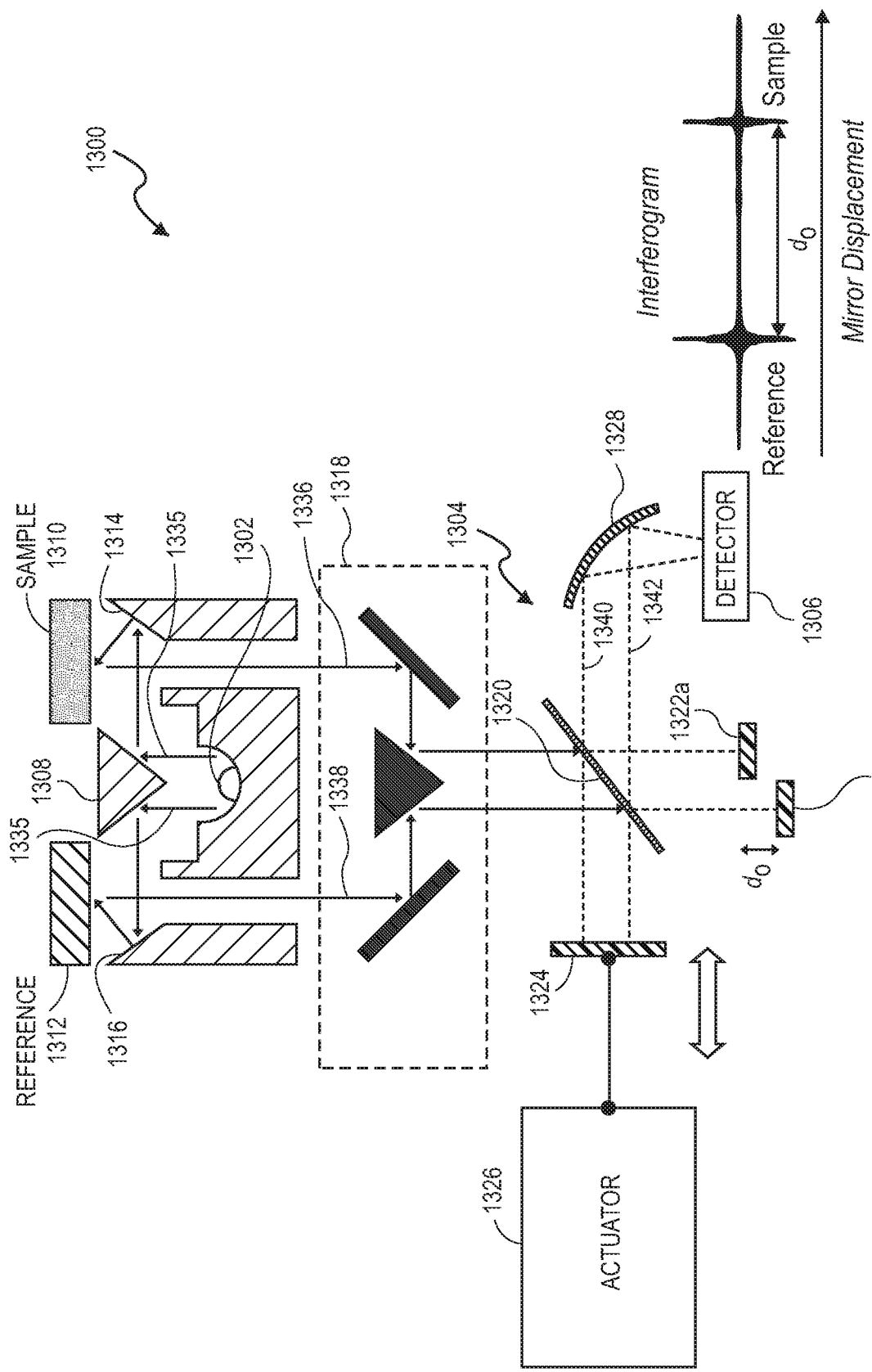
FIGS. 13A and 13B are diagrams illustrating other examples of a self-referenced spectrometers including a single detector and optical components designed to simultaneously illuminate a reference material and sample-under-test (SUT) and to direct the reflected light to the interferometer.
Figure 13B:
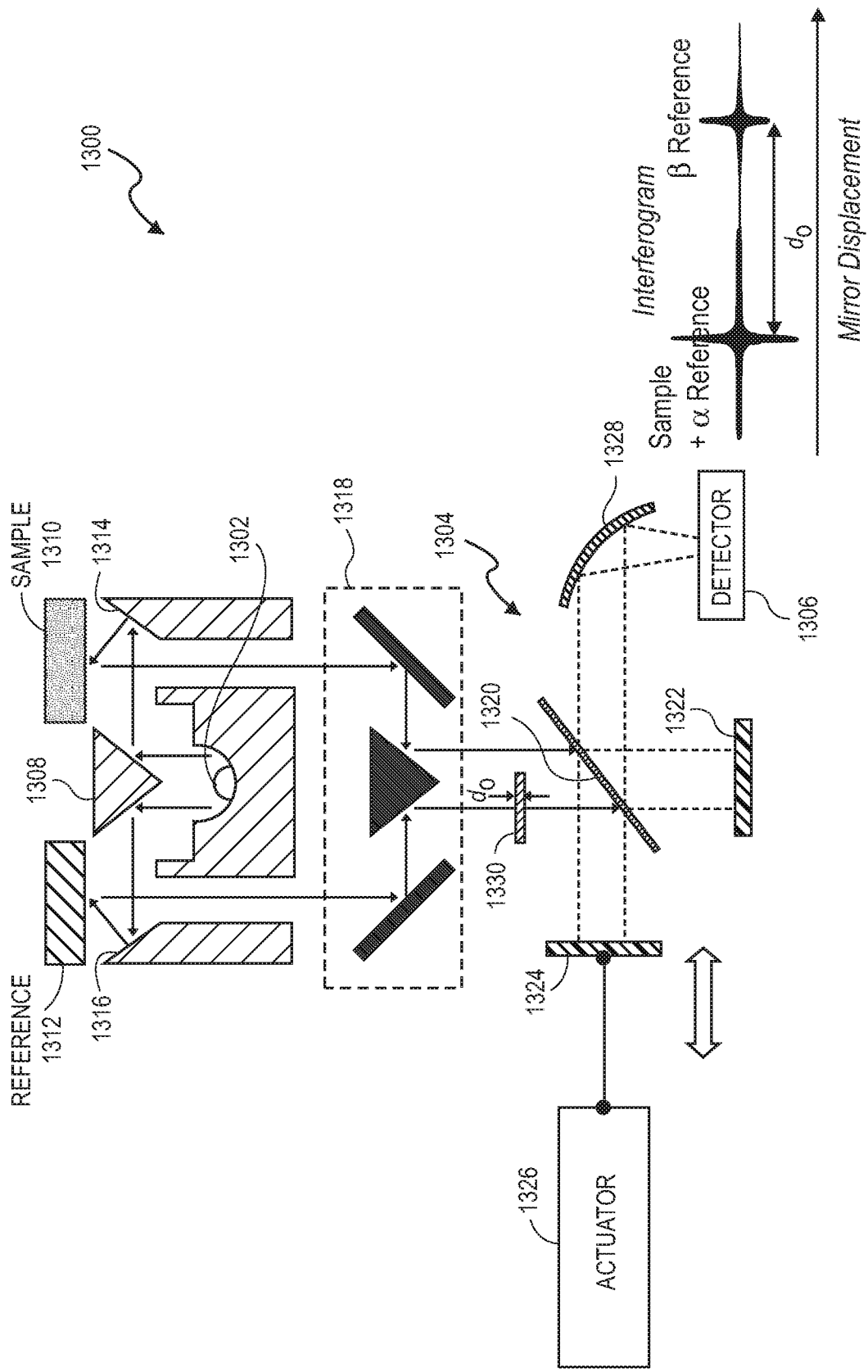

FIGS. 13A and 13B are diagrams illustrating another example of a self-referenced spectrometer 1300. The spectrometer 1300 includes a light source 1302, interferometer 1304, and a single detector 1306. The light source 1302 may correspond, for example, to the light source 102 shown in FIG. 1. In addition, the interferometer 1304 and the detector 1306 may correspond to the interferometer 104 and detector 106, respectively, shown in FIG. 1. In addition, the spectrometer 1300 may further include a processor and/or other circuitry (not shown, for simplicity).

The spectrometer 1300 further includes optical components designed to simultaneously illuminate a sample (e.g., a SUT) 1310 and a reference (e.g., a diffuse reflectance surface) 1312. In the example shown in FIG. 13, the spectrometer 1300 includes a splitter 1308 optically coupled to split an original source beam 1305 from the light source 1302 into a first source beam reflected by a first reflective surface 1314 towards the sample 1310 and a second source beam reflected by a second reflective surface 1316 towards the reference 1312. Light reflected from the sample 1310 and the reference 1312 as first and second input beams 1336 and 1338, respectively, may be directed towards a respective input of the interferometer 1304 via, for example, one or more waveguides and/or other additional optical components 1318, as described above in connection with FIG. 11.

In the example shown in FIG. 13A, the interferometer 1304 is a Michelson interferometer that includes a beam splitter 1320, fixed reflectors 1322a and 1322b (e.g., fixed mirrors), a moveable reflector 1324 (e.g., a moveable mirror), a MEMS actuator 1326 coupled to the moveable reflector 1324, and a focusing reflector 1328 (e.g., a curved reflector). The fixed mirrors 1322a and 1322b and the moveable mirror 1324 are each flat mirrors. In the example shown in FIG. 13, the first and second input beams 1336 and 1338 reflected from the sample 1310 and the reference 1312 are each input to the beam splitter 1320, which is optically coupled to split each of the input beams into respective incident beams. For example, the beam splitter 1320 may split the first input beam reflected from sample 1310 into a first incident beam that is directed towards the first fixed mirror 1322a and a second incident beam that is directed towards the moveable mirror 1324. The beam splitter 1320 may further split the second input beam reflected from the reference 1312 into a third incident beam that is directed towards the second fixed mirror 1322b and a fourth incident beam that is directed towards the moveable mirror 1324.

The first and second fixed mirrors 1322a and 1322b are each optically coupled to reflect the respective received first and third incident beams back towards the beam splitter 1320 as first and third reflected beams, respectively. The moveable mirror 1324 is optically coupled to reflect the received second and fourth incident beams back towards the beam splitter 1320 as second and fourth reflected beams. The moveable mirror 1324 is coupled to the MEMS actuator 1326 to produce a desired respective optical path difference (OPD) between the first and third reflected beams and the second and fourth reflected beams.

The first and second reflected beams interfere at the beam splitter 1320 to produce a first interfering beam 1340, whereas the third and fourth reflected beams interfere at the beam splitter 1320 to produce a second interfering beam 1342. The beam splitter 1320 is further optically coupled to direct the first and second interfering beams 1340 and 1342, respectively, towards the focusing reflector 1328 that focuses each of the first and second interfering beams 1340 and 1342, respectively, onto the single detector 1306 to detect a combined interference signal including both a first interference signal produced from the first interfering beam and a second interference signal produced from the second interfering beam. In this example, a first optical path is formed between a first input of the interferometer 1304 optically coupled to receive the first input beam reflected from the sample 1310 and the single output of the interferometer 1304 at the focusing reflector 1328, whereas a second optical path is formed between a second input of the interferometer 1304 optically coupled to receive the second input beam reflected from the reference 1112 and the single output of the interferometer 1304 at the focusing reflector 1328.

To use a single detector 1306, a sample interferogram (as shown in FIG. 13A) obtained from the first interference signal and a reference interferogram (as also shown in FIG. 13A) obtained from the second interference signal are spatially separated by shifting one of the fixed mirrors relative to the other. In the example shown in FIG. 13A, the first fixed mirror 1322a within the sample optical path is spatially offset from the second fixed mirror 1322b in the reference optical path (e.g., the first and second mirrors are spatially offset from one another with respect to the beam splitter 1320) by a distance $d_o$ corresponding to a target resolution within a predetermine margin in order to avoid cross-coupling between the first interfering signal and the second interfering signal. Consequently, the two interferograms (e.g., sample and reference) are also shifted from one another by a distance $d_o$.

In this example, the sample absorbance $A_s$ may be extracted from the measured combined interferogram $I_d$ as follows:

$$A_S = -\log_{10}\left(\frac{FFT|I_d \times W_S|}{FFT|I_d \times W_R|}\right) \qquad \text{(Equation 2)}$$

where $W_S$ and $W_R$ are the window functions to detect the sample interferogram and the reference interferogram, respectively. In some examples, $W_S$ and $W_R$ are shifted versions of the same window function W of mirror displacement x of the moveable mirror 1324:

$$W_S = W\left(x + \frac{d_o}{2}\right), W_R = W\left(x - \frac{d_o}{2}\right). \qquad \text{(Equation 3)}$$

It should be understood that in some examples, the interferometer 1304 may include a single fixed mirror and two moveable mirrors that are spatially offset from one another to produce the same combined interferogram that may be processed as described above.

In the example shown in FIG. 13B, instead of including two fixed mirrors 1322a and 1322b, a single fixed mirror 1322 is utilized, together with a thin film FP slab 1330. The FP slab 1330 is shown implemented within the second optical path (e.g., corresponding to a reference optical path) before the beam splitter 1320. The FP slab 1330 has a thickness $d_o$, and therefore, produces multiple instances of reference light (e.g., the second input beam) delayed from one another by an amount equal to $2d_o$. This results in two instances of the reference interferogram (as shown in FIG. 13B) with power ratios of α and β with respect to the reference light spaced apart by $2d_o$, having a main instance (burst) aligned with the sample interferogram. A processor (not shown) may then extract the reference power spectral density (PSD) from the right half of the interferogram, and utilize the reference PSD to extract the sample PSD from the left half of the interferogram (which includes a summation of both the sample interferogram and the β part of the reference interferogram).

Figure 14:
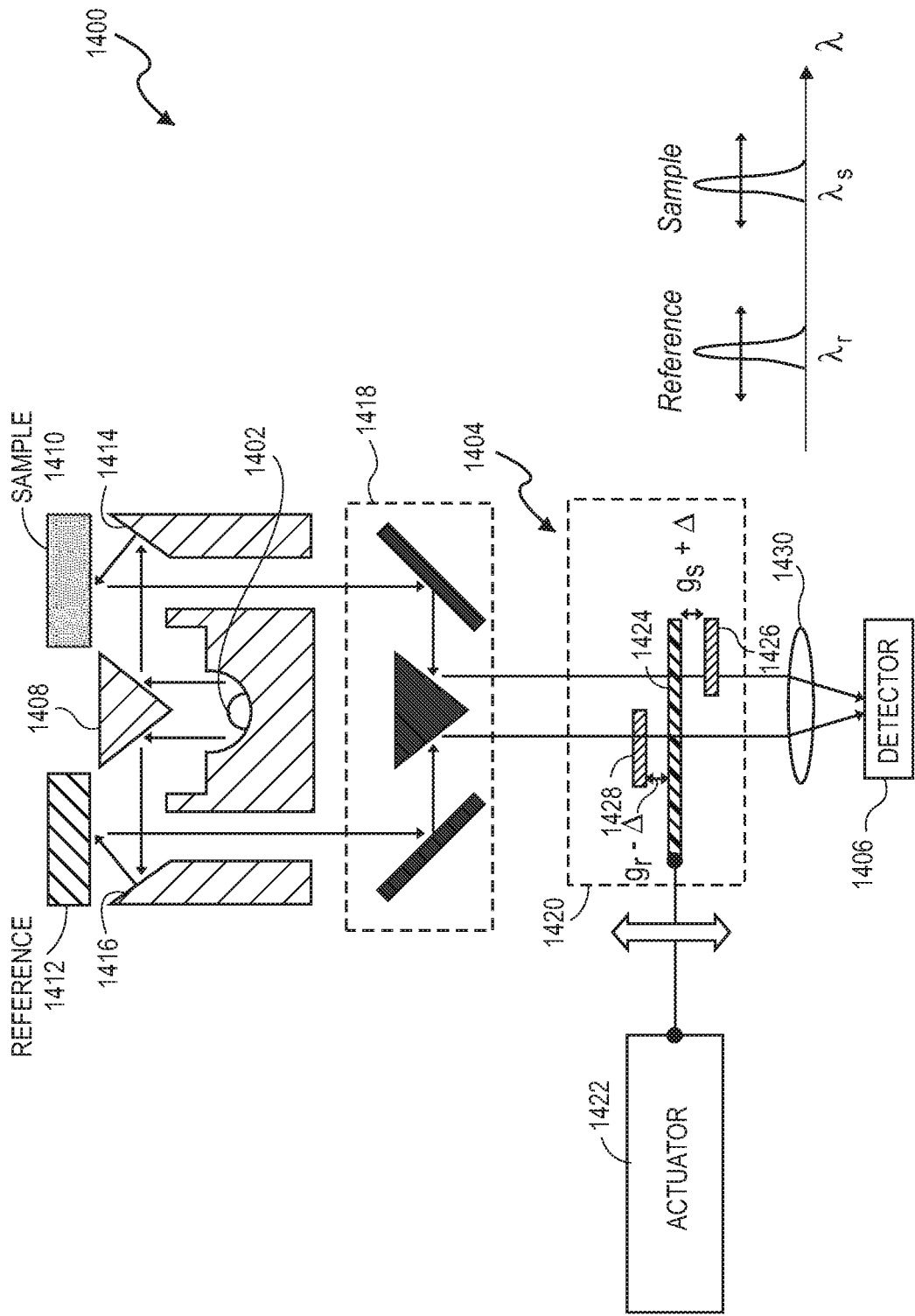
FIG. 14 is a diagram illustrating another example of a self-referenced spectrometer including a single detector and optical components designed to simultaneously illuminate a reference material and sample-under-test (SUT) and to direct the reflected light to the interferometer.

FIG. 14 is a diagram illustrating another example of a self-referenced spectrometer 1400. The spectrometer 1400 includes a light source 1402, interferometer 1404, and a single detector 1406. The light source 1402 may correspond, for example, to the light source 102 shown in FIG. 1. In addition, the interferometer 1404 and the detector 1406 may correspond to the interferometer 104 and detector 106, respectively, shown in FIG. 1. In addition, the spectrometer 1400 may further include a processor and/or other circuitry (not shown, for simplicity).

The spectrometer 1400 further includes optical components designed to simultaneously illuminate a sample (e.g., a SUT) 1410 and a reference (e.g., a diffuse reflectance surface) 1412. In the example shown in FIG. 14, the spectrometer 1400 includes a splitter 1408 optically coupled to split an original source beam from the light source 1402 into a first source beam reflected by a first reflective surface 1414 towards the sample 1410 and a second source beam reflected by a second reflective surface 1416 towards the reference 1412. Light reflected from the sample 1410 and the reference 1412 may be directed towards a respective input of the interferometer 1404 via, for example, one or more waveguides and/or other additional optical components 1418, as described above in connection with FIG. 11.

In the example shown in FIG. 14A, the interferometer 1404 is a FP interferometer including a tunable FP filter 1420 and a focusing lens 1430. The tunable FP filter 1420 includes a moveable slab 1424 coupled to a MEMS actuator 1422 and two fixed slabs 1426 and 1428, each located on a separate side of the moveable slab 1424. A first fixed slab 1426 is located on a first side of the moveable slab 1424 that is nearest the output of the interferometer 1404 towards the detector 1406, while a second fixed slab 1428 is located on a second side of the moveable slab 1424 opposite the first side and nearest the input of the interferometer 1404. The first fixed slab 1426 and the second fixed slab 1428 each have a length that is approximately half a length of the moveable slab 1424 and are positioned such that the first fixed slab 1426 is proximal to a first part of the moveable slab 1424 corresponding to a first half of the length of the moveable slab 1424 and the second fixed slab 1428 is proximal to a second part of the moveable slab 1424 corresponding to a second half of the length (e.g., the other half of the length) of the moveable slab 1426.

Thus, the first fixed slab 1426 is included within a first optical path (e.g., a sample arm) between a first input of the interferometer 1404 optically coupled to receive the reflected input beam from the sample 1410 and the focusing lens 1430, while the second fixed slab 1428 is included within a second optical path (e.g., a reference arm) between a second input of the interferometer 1404 optically coupled to receive the reflected input beam from the reference 1412 and the focusing lens 1430.

The MEMS actuator 1422 is configured to displace the moveable slab 1424 of the FP tunable filter 1420 to vary a sample gap $g_s$ between the moveable slab 1424 and the first fixed slab 1426 such that the sample gap is increased (e.g., $g_s+\Delta$). The MEMS actuator 1422 is further configured to displace the moveable slab 1424 to vary a reference gap $g_r$ between the moveable slab 1424 and the second fixed slab 1426 such that the reference gap is decreased (e.g., $g_r-\Delta$). The displacement of the moveable slab 1424 results in two different isolated spectral bands being coupled to the detector 1406 via focusing lens 1430, where a first band $\lambda_s$ corresponds to a sample interference signal detected by the detector 1406 and a second band $\lambda_r$ corresponds to a reference interference signal detected by the detector 1406. The spectral range may be scanned by varying the gap of the FP tunable filter 1420. When both gaps are equal, the sample interference signal and the reference interference signal may be overlapping. However, a processor (not shown) may be configured to predict the overlapped band in order to isolate each signal (sample and reference).

Figure 15A:
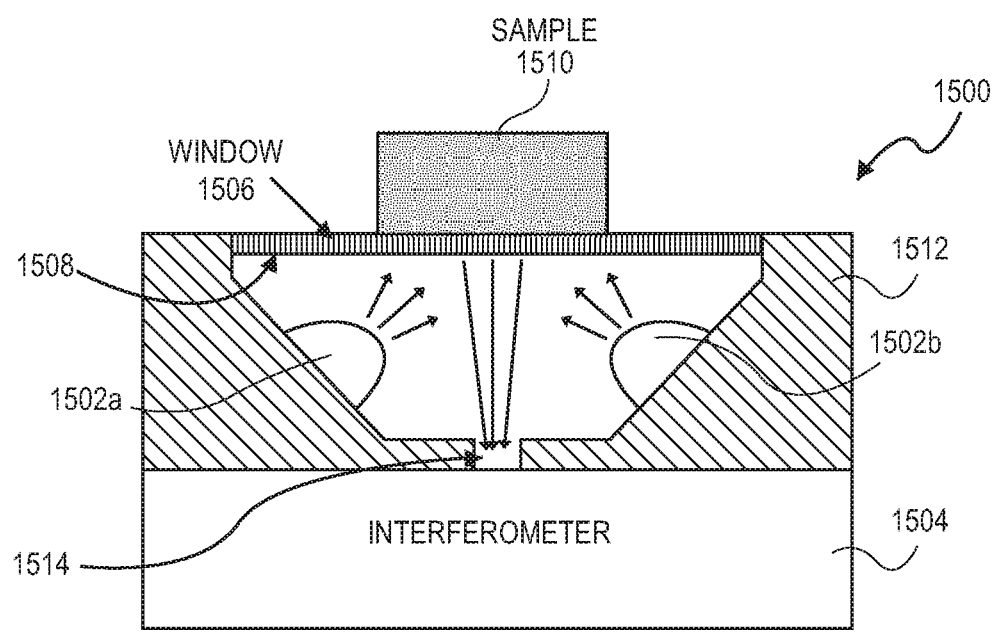
FIG. 15A is a diagram illustrating an example of a self-referenced spectrometer including optical components designed to simultaneously reflect light from a background source and a SUT.

FIG. 15A is a diagram illustrating another example of a self-referenced spectrometer 1500. The spectrometer 1500 includes light sources 1502a and 1502b and an interferometer 1504. The interferometer 1504 may include an output coupled to a single detector (not shown). The light sources 1502a and 1502b may correspond, for example, to the light source 102 shown in FIG. 1. In addition, the interferometer 1504 may correspond to the interferometer 104 shown in FIG. 1. The spectrometer 1500 may further include a processor and/or other circuitry (not shown, for simplicity).

The spectrometer 1500 may further include a housing 1512 containing the light sources 1502a and 1502b and including a window 1506 on which a sample (e.g., SUT) 1510 may be placed. The housing 1512 further includes an opening 1514 forming an input or coupling aperture into the interferometer 1504. In some examples, the interferometer may include a Michelson interferometer, a MZ interferometer or a FP interferometer. In some examples, the interferometer 1504 may be implemented on a MEMS chip and the housing 1512 may be bonded to the MEMS chip.

In the example shown in FIG. 15A, the light sources 1502a and 1502b are optically coupled to emit respective source beams to illuminate the sample 1510 on the window 1506. Diffuse-reflected light from the sample 1510 may then be coupled as a first input beam to the input of the interferometer 1504 via the opening 1514, which may be measured as a sample signal (e.g., the first interference signal). A second input beam to the interferometer 1504 may include light back-reflected from the window 1506, which may then be input to the interferometer 1504 and measured as a background reference signal (e.g., the second interference signal). In this example, the window 1506 extends under and around the sample 1510 and is coupled to respective sides of the housing 1512. To enable simultaneous measurement of the sample 1510 and the background (e.g., back-reflected light from the window 1506), the window 1506 may include an anti-reflection coating 1508 selected to totally reflect a desired range of the spectrum and to pass a remaining range of the spectrum to the sample 1510 to be reflected from the sample 1510.

Figure 15B:
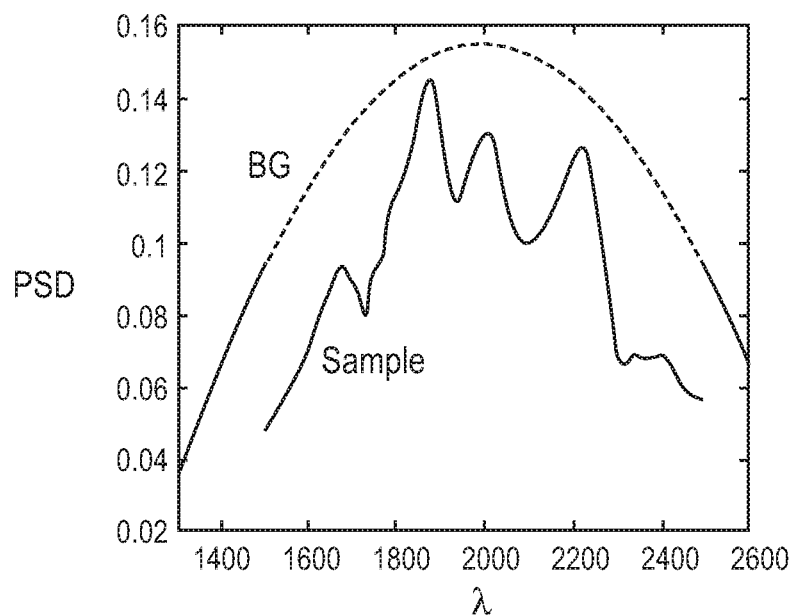
FIG. 15B is a graph illustrating estimation of a background signal based on the reflected light from the background source and stored calibration measurements.

The wavelength range reflected from the window 1506 may be used to estimate the entire background signal, as illustrated in the graph of FIG. 15B. In the example shown in FIG. 15B, the spectrometer may simultaneously measure both a sample interference signal across a sample spectrum and a background interference signal across a background spectrum. The sample spectrum has a wavelength range of between 1400 and 2500 nm, while the background spectrum has wavelength ranges of between 1300 nm and 1400 nm and between 2500 nm and 2600 nm. The measured background (BG) spectrum (e.g., between 1300 nm and 1400 nm and between 2500 nm and 2600 nm) may be utilized to estimate the remaining portion of the background (BG) signal (e.g., between 1500 nm and 2500 nm).

In some examples, the remaining portion of the background signal may be estimated using both the measured BG spectrum and a calibration reading of the background signal taken when a reference diffuse-reflectance standard is placed on the window 1506. The calibration reading may be updated periodically to compensate for any changes in the spectrometer. In addition, readings from a temperature sensor (not shown) may also be utilized to compensate for any changes in the detector response due to temperature changes. In other examples, instead of providing an anti-reflection coating 1508 on the window 1506, the back-reflection from the window 1506 (e.g., without a SUT or reference diffuse-reflectance standard present) may be utilized as the background signal. However, in this example, the background signal is not measured simultaneously with the sample signal.

Figure 16A:
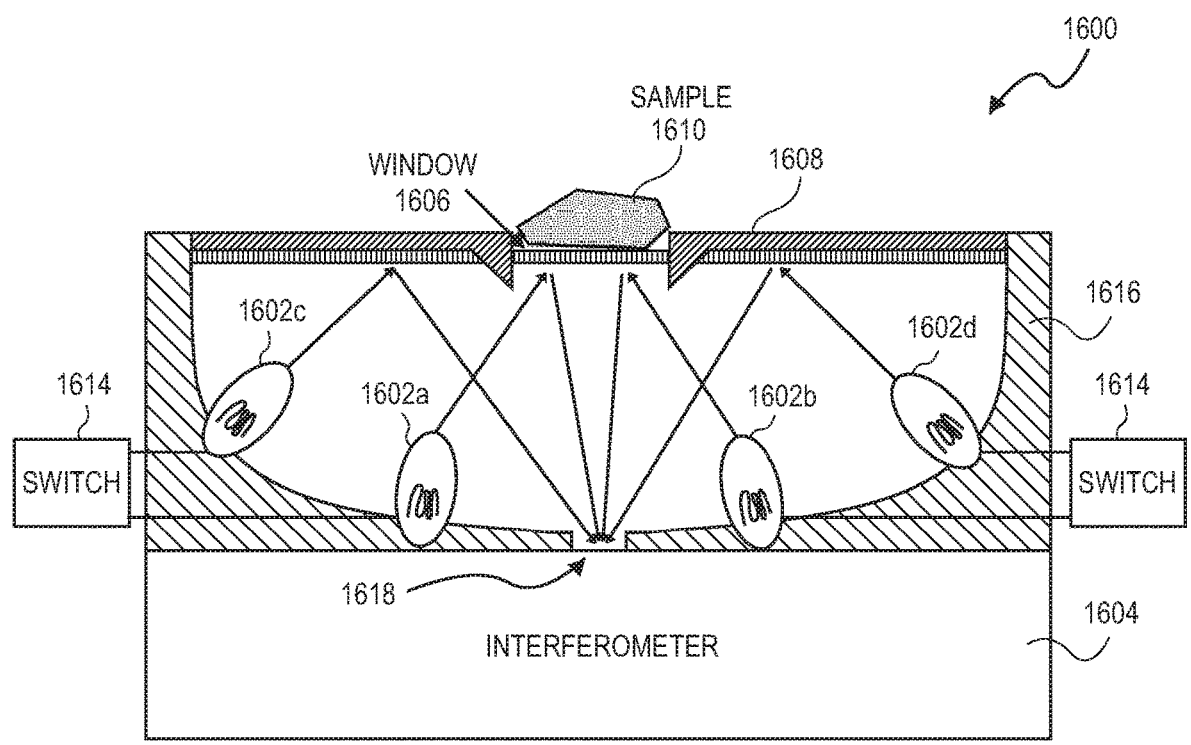
FIGS. 16A and 16B are diagrams illustrating other examples of a self-referenced spectrometer including optical components designed to simultaneously reflect light from a background source or reference material and a SUT.
Figure 16B:
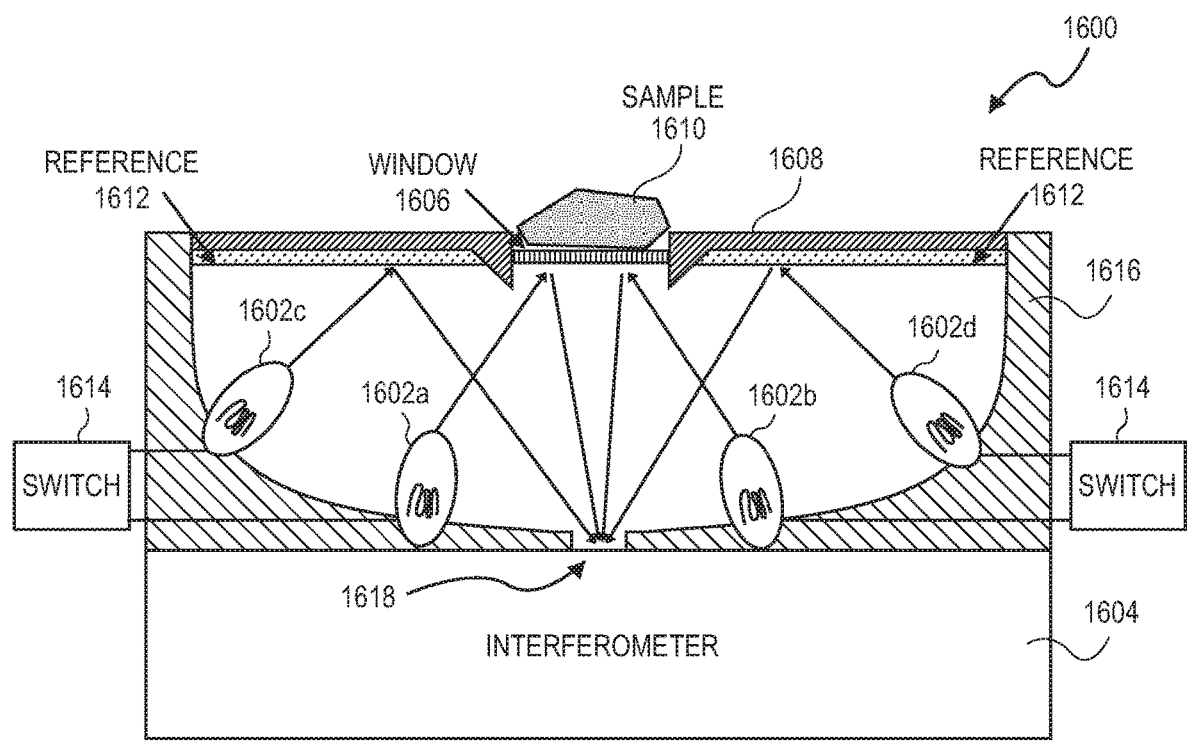

FIGS. 16A and 16B are diagrams illustrating other examples of a self-referenced spectrometer 1600. The spectrometer 1600 includes a first set of light emitters 1602a and 1602b, a second set of light emitters 1602c and 1602d, and an interferometer 1604. The interferometer 1604 may include an output coupled to a single detector (not shown). The light emitters 1602a-1602d may correspond, for example, to the light source 102 shown in FIG. 1. In addition, the interferometer 1604 may correspond to the interferometer 104 shown in FIG. 1. The spectrometer 1600 may further include a processor and/or other circuitry (not shown, for simplicity).

The spectrometer 1600 may further include a housing 1616 containing the light emitters 1602a-1602d and including a window 1606 on which a sample (e.g., SUT) 1610 may be placed. The housing 1616 further includes an opening 1618 forming an input or coupling aperture into the interferometer 1604. In some examples, the interferometer may include a Michelson interferometer, a MZ interferometer or a FP interferometer. In some examples, the interferometer 1604 may be implemented on a MEMS chip and the housing 1616 may be bonded to the MEMS chip.

In the example shown in FIG. 16A, each set of light emitters (e.g., the first set of light emitters 1602a and 1602b and the second set of light emitters 1602c and 1602d) may be optically coupled to emit respective source beams to illuminate both the sample 1610 and the window 1606 simultaneously. However, the second set of light emitters 1602c and 1602d may be positioned near edges of the housing 1616 to produce more back-reflection from the window 1606 towards the opening 1618 than the first set of light emitters 1602a and 1602b. Thus, the reflected spectra resulting from light originating from each set of light emitters 1602a/1602b and 1602c/1602d may be different.

To extract the sample spectrum and the background spectrum, the light emitters 1602a-1602d may be coupled to a switch 1614 configured to alternately turn on the first set of light emitters 1602a and 1602b and the second set of light emitters 1602c and 1602d. For example, the switch 1614 may turn on the first set of light emitters 1602a and 1602b and turn off the second set of light emitters 1602c and 1602d at a first time ($t_1$) to enable the interferometer 1604 to measure a first combined interference signal $S_1$. Then, at a second time ($t_2$), the switch 1614 may turn off the first set of light emitters 1602a and 1602b and turn on the second set of light emitters 1602c and 1602d to enable the interferometer to measure a second combined interference signal $S_2$. The combined interference signals $S_1$ and $S_2$ may be expressed as:

$$S_1 = aS_S + bS_R \quad \text{(Equation 4)}$$

$$S_2 = cS_S + dS_R \quad \text{(Equation 5)}$$

where $S_S$ is the contribution of the sample interference signal, $S_R$ is the contribution of the background interference signal, and a, b, c, and d are constants representing ratios of adding the sample interference signal to the background interference signal. As a result, the signals $S_1$ and $S_2$ may be considered as originating from different light sources, and therefore the processor (not shown) may utilize a blind source separation (BSS) algorithm to extract $S_s$ and $S_R$. In some examples, the switch 1614 may further be controlled by the processor.

In some examples, the window 1606 may include an optional blocking material 1608 extending along a top surface of the window 1606 and further extending below the window 1606 surrounding the sample 1610. The blocking material 1608 may be designed to prevent light emitted from the second set of light emitters 1602c and 1602d from reaching the sample 1610 and to further prevent light emitted from the first set of light emitters 1602a and 1602b from reaching the window 1606 surrounding the sample 1610. In this example, $S_1 = S_S$ and $S_2 = S_R$. However, in this example, the sample interference signal $S_S$ and background interference signal $S_R$ are measured separately (e.g., at time $t_1$ and $t_2$, respectively).

In the example shown in FIG. 16B, instead of using a background interference signal resulting from back-reflection from the window 1606 to process the sample interference signal, a reference diffuse reflectance material 1612 may be coupled between respective sides of the housing 1616 and the window 1606. For example, the reference diffuse reflectance material 1612 may include an opening in the center thereof and a lip surrounding the opening to receive the window 1606. In some examples, the window 1606 may further be bonded to the lip of the reference diffuse reflectance material 1612 to secure the window 1606 in place. In this example, a reference interference signal (instead of a background interference signal) may be extracted from the combined interference signals $S_1$ and $S_2$. The sample and reference interference signals may be extracted using, for example, a BSS algorithm, as described above.

In some examples, the blocking material 1608 may further be included along a top surface of the reference diffuse reflectance material 1612 and surrounding the window 1606 such that light emitted from the second set of light emitters 1602c and 1602d is reflected by the reference diffuse reflectance material 1612 and coupled to the interferometer 1604 to produce the background interference signal, while light emitted from the first set of light emitters 1602a and 1602b is reflected by the sample 1610 and coupled to the interferometer to produce the sample interference signal. Thus, the light emitted from the first set of light emitters 1602a and 1602b contributes only to $S_s$, while light emitted from the second set of light emitters 1602c and 1602c contributes only to $S_R$. However, in this example, the sample interference signal $S_s$ and background interference signal $S_R$ are measured separately (e.g., at time $t_1$ and $t_2$, respectively).

Figure 17:
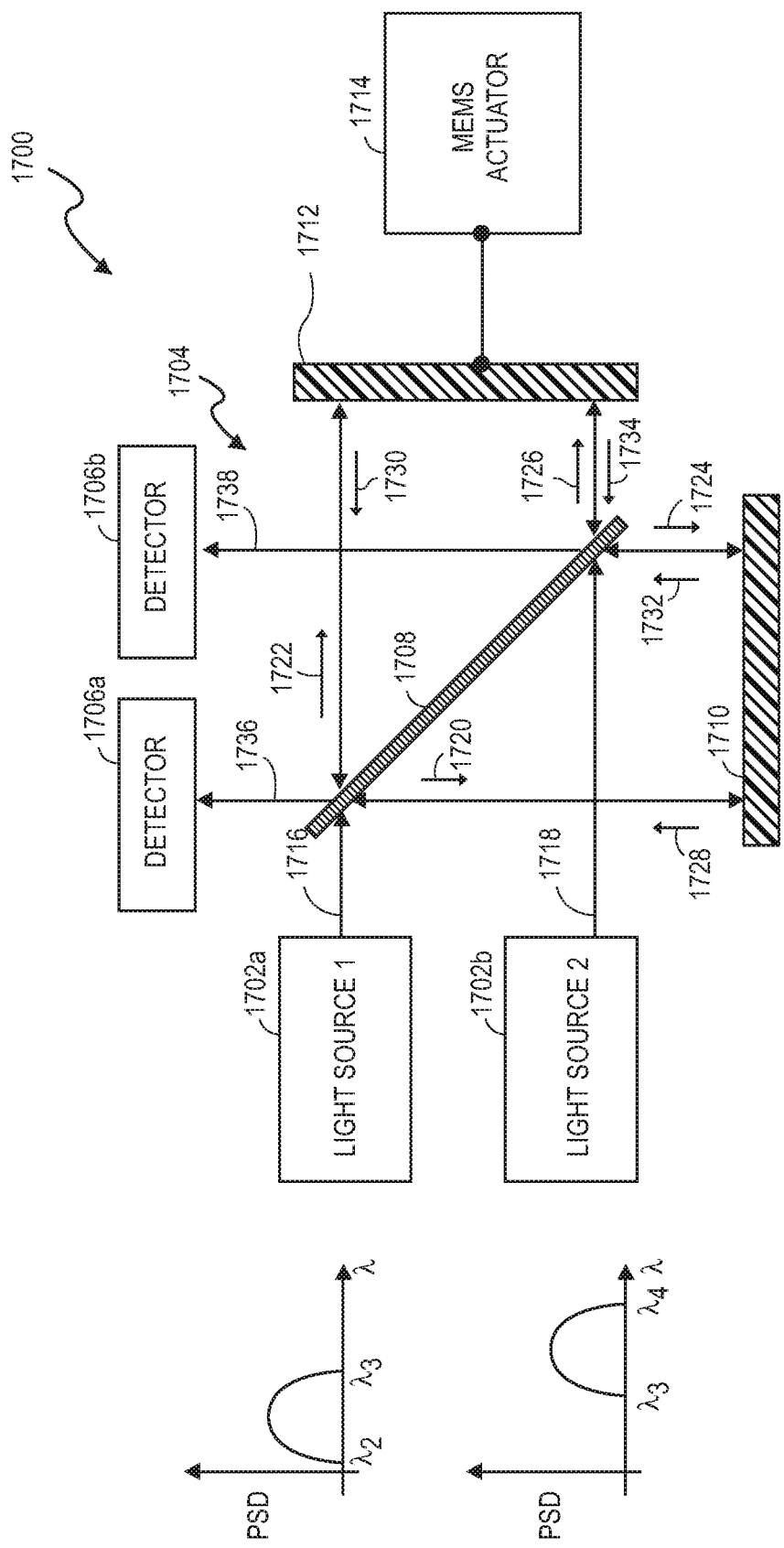
FIG. 17 is a diagram illustrating an example of a self-referenced spectrometer based on a Michelson interferometer and including two light sources, each optimized for a different spectral range.

FIG. 17 is a diagram another example of a self-referenced spectrometer 1700. The spectrometer 1700 includes two light sources 1702a and 1702b, an interferometer 1704 and two detectors 1706a and 1706b. Each of the light sources 1702a and 1702b may be optimized for a different spectral (wavelength) range. For example, light source 1702a may be configured to emit a first input beam 1716 in a first spectral range (e.g., between $\lambda_2$ and $\lambda 3$), while the second light source 1702b may be configured to emit a second input beam 1718 in a second spectral range (e.g., between $\lambda_3$ and $\lambda_4$). The light sources 1702a and 1702b may correspond, for example, to the light source 102 shown in FIG. 1. In addition, the interferometer 1704 and the detectors 1706a and 1706*b* may correspond to the interferometer 104 and detector 106, respectively, shown in FIG. 1. In addition, the spectrometer 1700 may further include a processor and/or other circuitry (not shown, for simplicity).

The interferometer 1704 is a Michelson interferometer that includes a beam splitter 1708, a fixed reflector 1710 (e.g., a fixed mirror), a moveable reflector 1712 (e.g., a moveable mirror), and a MEMS actuator 1714 coupled to the moveable reflector 1712. The fixed mirror 1710 and the moveable mirror 1712 are each flat mirrors. In the example shown in FIG. 17, the first and second input beams 1716 and 1718, respectively, are each input to the beam splitter 17108, which is optically coupled to split each of the input beams into respective incident beams. For example, the beam splitter 1708 may split the first input beam 1716 into a first incident beam 1720 and a second incident beam 1722 and may direct the first incident beam 1720 towards the fixed mirror 1710 and the second incident beam 1722 towards the moveable mirror 1712. In addition, the beam splitter 1708 may split the second input beam 1718 into a third incident beam 1724 and a fourth incident beam 1726 and direct the third incident beam 1724 towards the fixed mirror 1710 and the fourth incident beam 1726 towards the moveable mirror 1712.

The fixed mirror 1710 is optically coupled to reflect the received first and third incident beams 1720 and 1724, respectively back towards the beam splitter 1708 as first and third reflected beams 1728 and 1732, respectively. The moveable mirror 1712 is optically coupled to reflect the received second and fourth incident beams 1722 and 1726, respectively, back towards the beam splitter 1708 as second and fourth reflected beams 1730 and 1734, respectively. The moveable mirror 1712 is coupled to the MEMS actuator 1714 to produce a desired respective optical path difference (OPD) between the first and third reflected beams and the second and fourth reflected beams.

The first and second reflected beams 1728 and 1730, respectively, interfere at the beam splitter 1708 to produce a first interfering beam 1736, whereas the third and fourth reflected beams 1732 and 1734, respectively, interfere at the beam splitter 1708 to produce a second interfering beam 1738. The beam splitter 1708 is further optically coupled to direct the first interfering beam 1736 towards detector 1706*a* to detect a first interference signal and the second interfering beam 1738 towards detector 1706*b* to detect a second interference signal. A processor (not shown) may then utilize the interference signal detected by detector 1706*b* as a reference signal in processing the interference signal detected by detector 1706*a*. For example, the interference signal corresponding to the second spectral range detected by detector 1706*b* may be used to compensate or calibrate any errors in the interference signal corresponding to the first spectral range detected by detector 1706*a*. In this example, a first optical path is formed between a first input of the interferometer 1704 optically coupled to receive the first input beam 1716 and a first output thereof directing the first interfering beam 1736 towards the first detector 1706*a*, whereas a second optical path is formed between a second input of the interferometer 1704 optically coupled to receive the second input beam 1718 and a second output thereof directing the second interfering beam 1738 towards the second detector 1706*b*. In some examples, a sample and reference may be present at the respective outputs of the interferometer, as in FIG. 2, to produce sample and reference interference signals in different spectral ranges.

Figure 18:
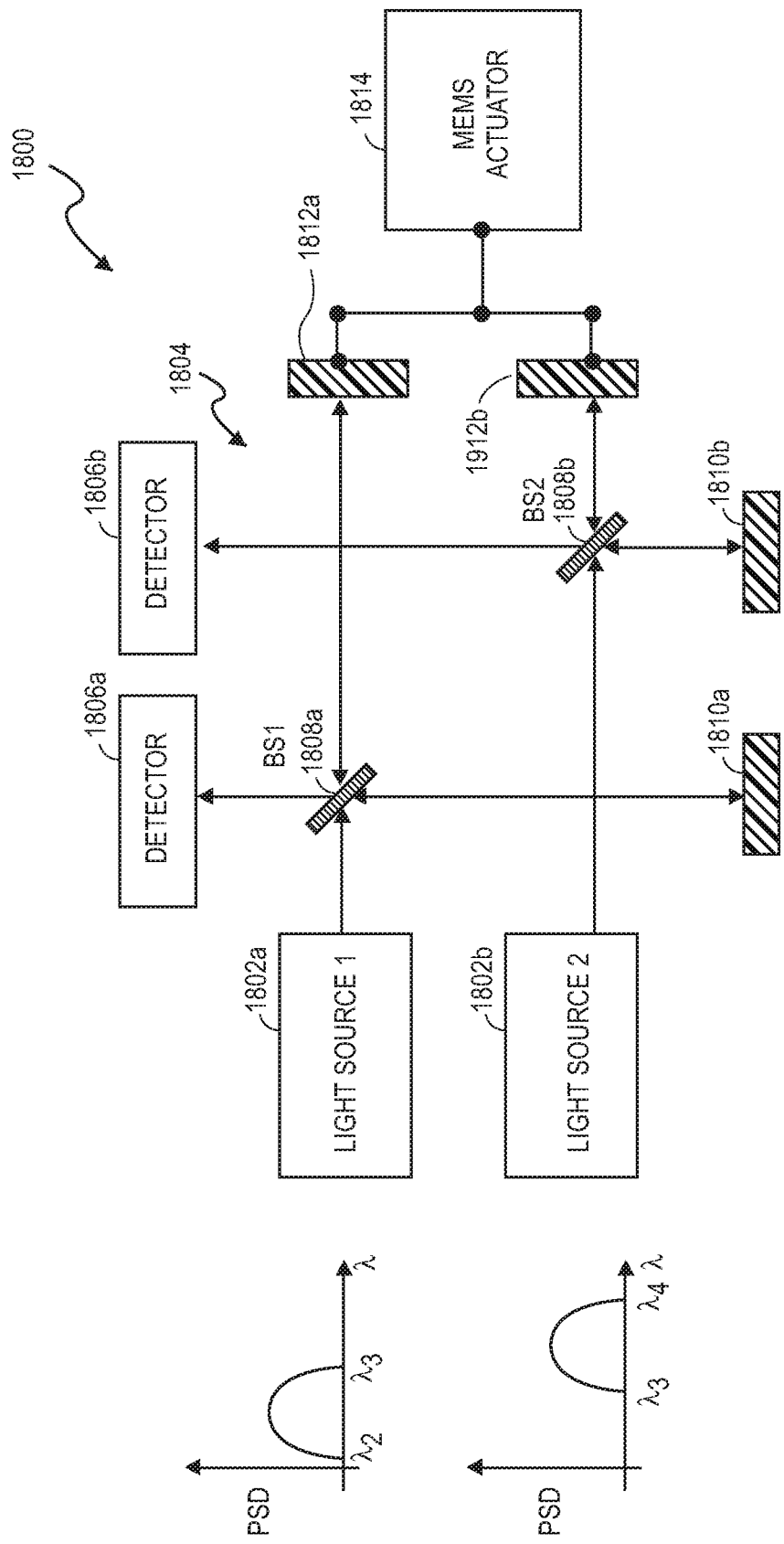
FIG. 18 is a diagram illustrating another example of a self-referenced spectrometer based on a Michelson interferometer and including two light sources, each optimized for a different spectral range.

FIG. 18 is a diagram illustrating another example of a self-referenced spectrometer 1800. As in FIG. 17, the spectrometer 1800 includes two light sources 1802*a* and 1802*b*, an interferometer 1804 and two detectors 1806*a* and 1806*b*. Each of the light sources 1802*a* and 1802*b* may be optimized for a different spectral (wavelength) range. For example, light source 1802*a* may be configured to emit a first input beam in a first spectral range (e.g., between $\lambda_2$ and $\lambda 3$), while the second light source 1802*b* may be configured to emit a second input beam in a second spectral range (e.g., between $\lambda_3$ and $\lambda_4$). The light sources 1802*a* and 1802*b* may correspond, for example, to the light source 102 shown in FIG. 1. In addition, the interferometer 1804 and the detectors 1806*a* and 1806*b* may correspond to the interferometer 104 and detector 106, respectively, shown in FIG. 1. In addition, the spectrometer 1800 may further include a processor and/or other circuitry (not shown, for simplicity).

The interferometer 1804 is a Michelson interferometer that includes two beam splitters 1808*a* and 1808*b*, two fixed reflectors 1810*a* and 1810*b* (e.g., fixed mirrors), two moveable reflectors 1812*a* and 1812*b* (e.g., moveable mirrors), and a MEMS actuator 1814 coupled to the moveable reflectors 1812*a* and 1812*b*. In some examples, each beam splitter 1808*a* and 1808*b* is optimized for the particular wavelength range produced by the corresponding light source 1802*a* and 1802*b*. For example, one of the beam splitters 1808*a* may be an air/silicon beam splitter, while the other beam splitter 1808*b* may be a hollow waveguide splitter, thus enabling the wavelength range to be extended into the UV/visible spectrum, where propagation inside of silicon may be lossy. Each of the beam splitters 1808*a* and 1808*b* may be monolithically integrated with the same MEMS actuator 1814, as shown in FIG. 18.

In the example shown in FIG. 18, each input beam from a respective light source 1802*a* and 1802*b* is input to a respective beam splitter 1808*a* and 1808*b*, respectively, which is optically coupled to split each of the input beams into respective incident beams. For example, the beam splitter 1808*a* may split the first input beam from the first light source 1802*a* into a first incident beam and a second incident beam and may direct the first incident beam towards the first fixed mirror 1810*a* and the second incident beam towards the first moveable mirror 1812*a*. In addition, the second beam splitter 1808*b* may split the second input beam from the second light source 1802*b* into a third incident beam and a fourth incident beam and direct the third incident beam towards the second fixed mirror 1810*b* and the fourth incident beam towards the second moveable mirror 1812*b*.

The first fixed mirror 1810*a* is optically coupled to reflect the received first incident beam back towards the first beam splitter 1808*a* as a first reflected beam. The first moveable mirror 1812*a* is optically coupled to reflect the received second incident beam back towards the first beam splitter 1808*a* as a second reflected beam. In addition, the second fixed mirror 1810*b* is optically coupled to reflect the received third incident beam back towards the second beam splitter 1808*b* as a third reflected beam. The second moveable mirror 1812*b* is further optically coupled to reflect the received fourth incident beam back towards the second beam splitter 1808*b* as a second reflected beam. Each moveable mirror 1812*a* and 1812*b* is coupled to the MEMS actuator 1814 to produce a desired respective optical path difference (OPD) between the first and third reflected beams and the second and fourth reflected beams.

The first and second reflected beams interfere at the first beam splitter 1808*a* to produce a first interfering beam towards the first detector 1806*a*, whereas the third and fourth reflected beams interfere at the second beam splitter 1808*b* to produce a second interfering beam towards the second detector 1806*b*. A processor (not shown) may then utilize the interference signal detected by detector 1806*b* as a reference signal in processing the interference signal detected by detector 1806*a*, as described above. In this example, a first optical path is formed between a first input of the interferometer 1804 optically coupled to receive the first input beam and a first output thereof directing the first interfering beam towards the first detector 1806*a*, whereas a second optical path is formed between a second input of the interferometer 1804 optically coupled to receive the second input beam and a second output thereof directing the second interfering beam towards the second detector 1806*b*. In some examples, a sample and reference may be present at the respective outputs of the interferometer, as in FIG. 2, to produce sample and reference interference signals in different spectral ranges.

Figure 19:
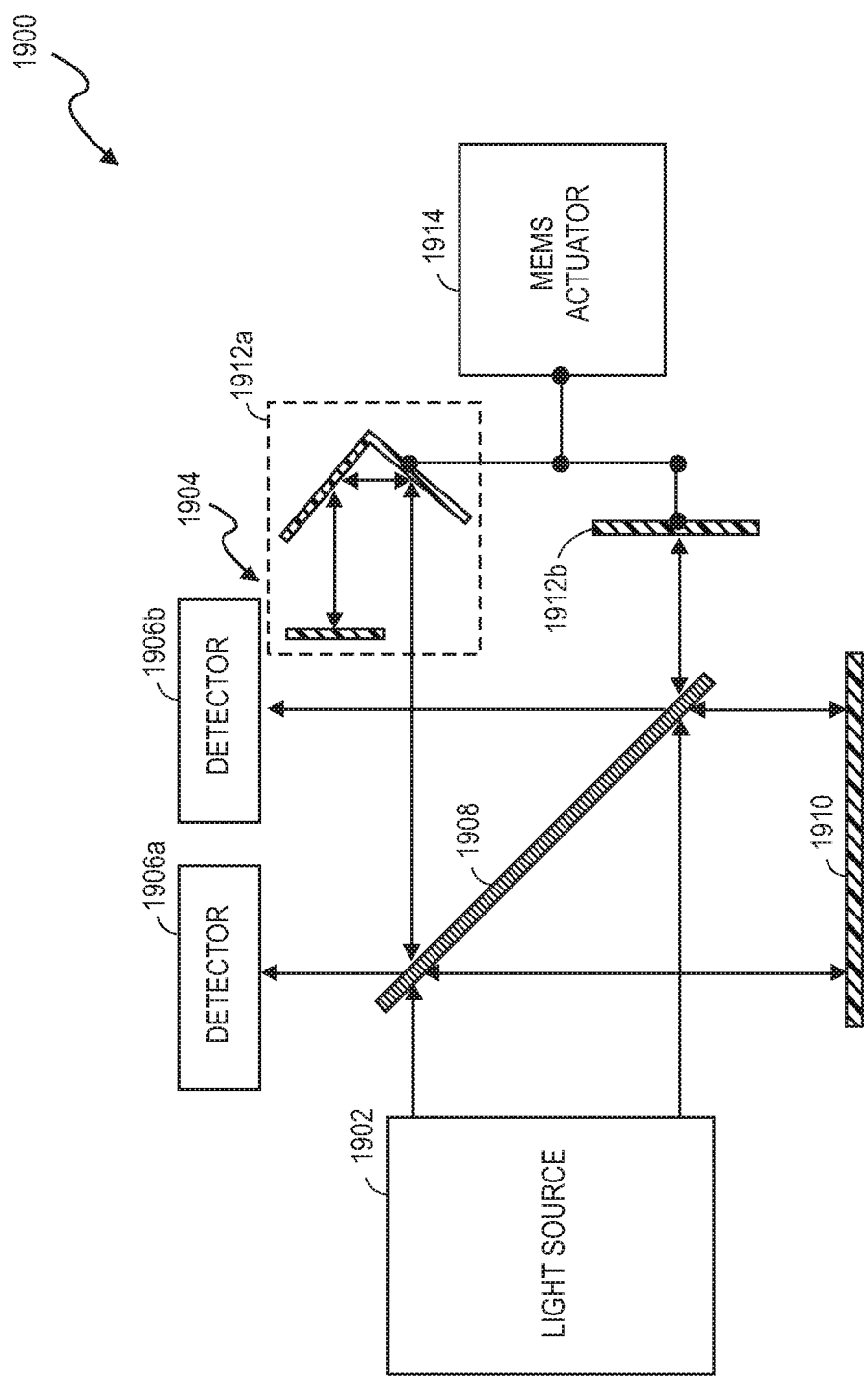
FIG. 19 is a diagram illustrating an example of a self-referenced spectrometer based on a Michelson interferometer and configured to simultaneously measure two different resolutions.

FIG. 19 is a diagram illustrating another example of a self-referenced spectrometer 1900. The spectrometer 1900 includes a light source 1902, interferometer 1904 and two detectors 1906*a* and 1906*b*. The light source 1902 may correspond, for example, to the light source 102 shown in FIG. 1. In addition, the interferometer 1904 and the detectors 1906*a* and 1906*b* may correspond to the interferometer 104 and detector 106, respectively, shown in FIG. 1. In addition, the spectrometer 1900 may further include a processor and/or other circuitry (not shown, for simplicity).

The interferometer 1904 is a Michelson interferometer that includes a beam splitter 1908, a fixed reflector 1910 (e.g., a fixed mirror), two moveable reflectors 1912*a* and 1912*b*, and a MEMS actuator 1914 coupled to the moveable reflectors 1912*a* and 1912*b*. A first moveable reflector 1912*a* is an optical path difference (OPD) multiplier corner mirror, while a second moveable reflector 1912*b* is a flat mirror. The two different moveable reflectors 1912*a* and 1912*b* enable measuring the PSD of an input beam from the light source 1902 at two different resolutions simultaneously.

For example, a first optical path may be formed through the moveable flat mirror 1912*b*, whereas a second optical path may be formed through the moveable OPD multiplier corner reflector. The second optical path through the flat moveable mirror 1912*b* provides a resolution $R_o$, while the second optical path through the OPD multiplier corner reflector 1912*a* provides a resolution $R_o/n$, with n=2 for the OPD multiplier corner reflector 1912*a* shown in FIG. 19. In an example, if signal-to-noise ratio (SNR) of the first optical path through the moveable OPD multiplier reflector 1912*a* is $S_o$, the SNR of the second optical path through the flat mirror 1910 is $2S_o$ (e.g., if the interferogram measured at detector 1906*a* is truncated to produce a resolution of $R_o$.

Figure 20:
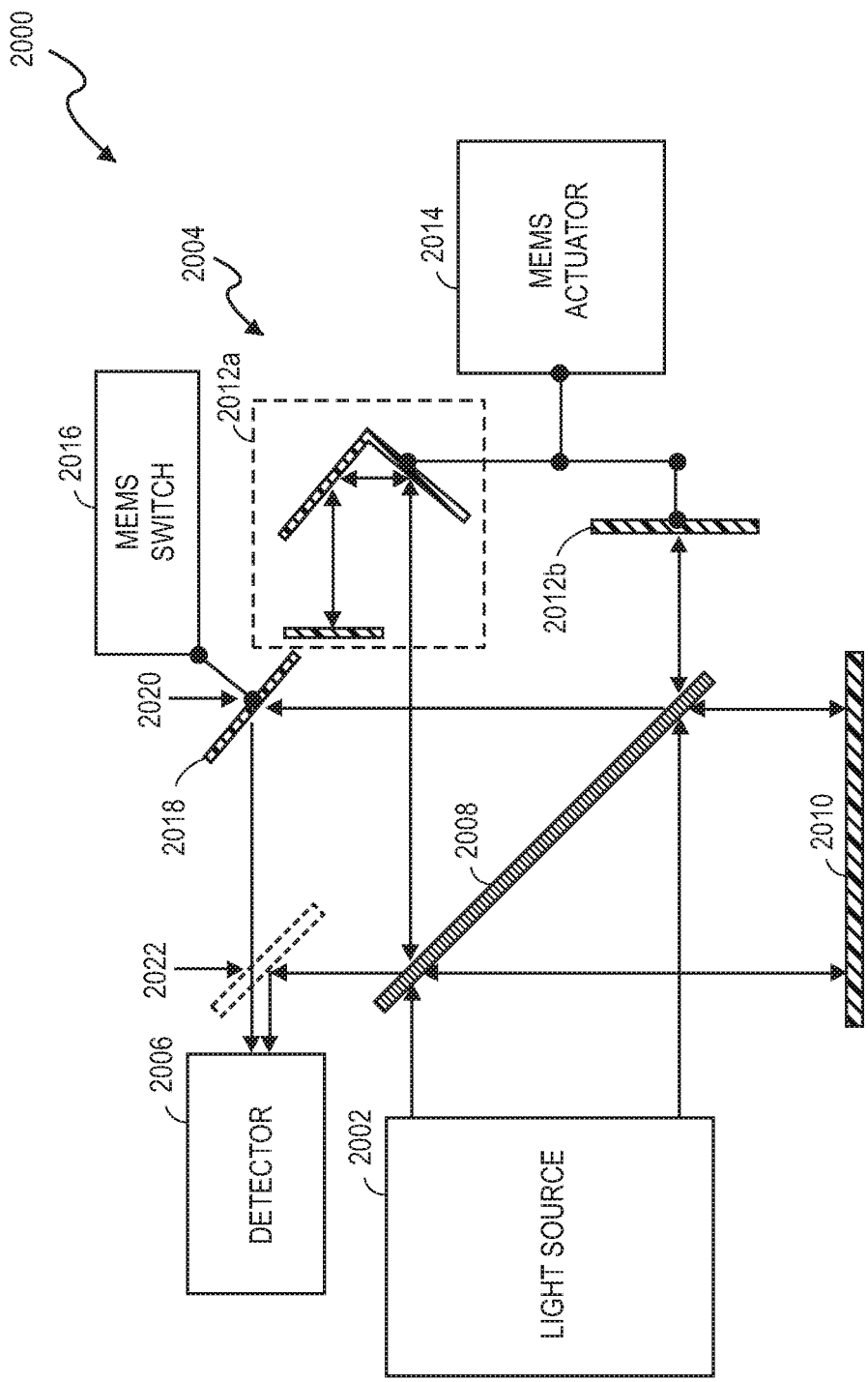
FIG. 20 is a diagram illustrating another example a self-referenced spectrometer based on a Michelson interferometer and configured to measure two different resolutions.

FIG. 20 is a diagram illustrating another example a self-referenced spectrometer 2000. The spectrometer 2000 includes a light source 2002, interferometer 2004 and a single detector 2006. The light source 2002 may correspond, for example, to the light source 102 shown in FIG. 1. In addition, the interferometer 2004 and the detector 2006 may correspond to the interferometer 104 and detector 106, respectively, shown in FIG. 1. In addition, the spectrometer 2000 may further include a processor and/or other circuitry (not shown, for simplicity).

The interferometer 2004 is a Michelson interferometer that includes a beam splitter 2008, a fixed reflector 2010 (e.g., a fixed mirror), two moveable reflectors 2012*a* and 2012*b*, and a MEMS actuator 2014 coupled to the moveable reflectors 2012*a* and 2012*b*. A first moveable reflector 2012*a* is an optical path difference (OPD) multiplier corner mirror, while a second moveable reflector 2012*b* is a flat mirror. Similar to the example shown in FIG. 19, the two different moveable reflectors 2012*a* and 2012*b* enable measuring the PSD of an input beam from the light source 2002 at two different resolutions. However, in the example shown in FIG. 20, a MEMS switch 2016 coupled to a flat mirror 2018 may be used to switch between the first optical path through the moveable OPD multiplier corner mirror 1912*a* and the second optical path through the moveable flat mirror 1912*b*. For example, the MEMS switch 2016 may be coupled to shift the flat mirror 2018 from a first position 2020 at which the first optical path is coupled to the detector 2006 and a second position 2022 at which the second optical path is coupled to the detector 2006.

Figure 21:
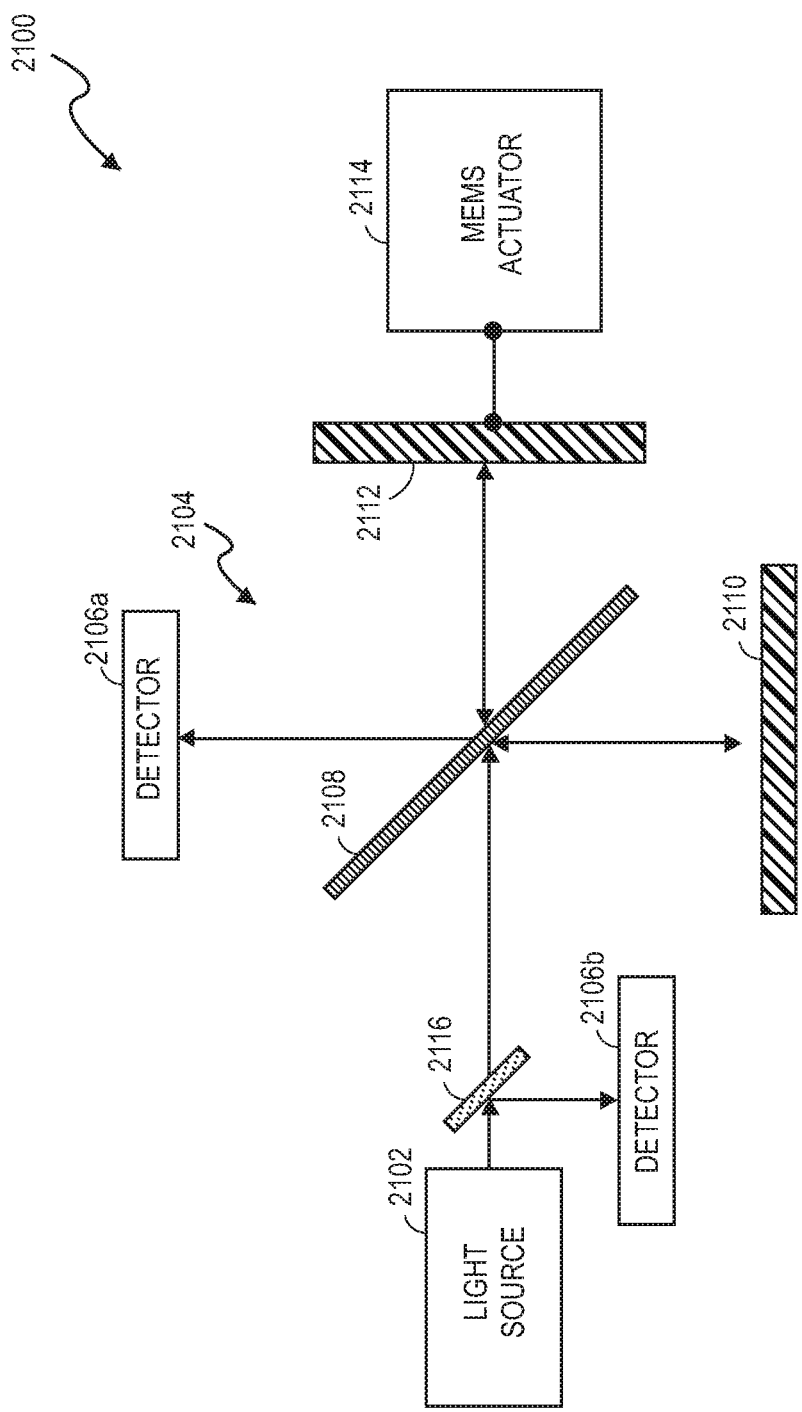
FIG. 21 is a diagram illustrating an example of a self-referenced spectrometer based on a Michelson interferometer and including a tap splitter at the input of the interferometer.

FIG. 21 is a diagram illustrating another example of a self-referenced spectrometer 2100. The spectrometer 2100 includes a light source 2102, interferometer 2104 and two detectors 2106*a* and 2106*b*. The light source 2102 may correspond, for example, to the light source 102 shown in FIG. 1. In addition, the interferometer 2104 and the detectors 2106*a* and 2106*b* may correspond to the interferometer 104 and detector 106, respectively, shown in FIG. 1. In addition, the spectrometer 2100 may further include a processor and/or other circuitry (not shown, for simplicity).

The interferometer 2104 is a Michelson interferometer that includes a beam splitter 2108, a fixed reflector 2110 (e.g., a fixed mirror), a moveable reflector 2112 (e.g., a moveable mirror), and a MEMS actuator 2114 coupled to the moveable reflector 2112. The fixed mirror 2110 and the moveable mirror 2112 are both flat mirrors. The interferometer 2104 further includes a tap splitter or coupler 2116 at an input of the interferometer 2104 optically coupled to receive the input beam from the light source 2102 and to redirect a portion of the input beam to the second detector 2106*b* to sample the light source power upon entering the interferometer. The tap splitter or coupler 2116 may further direct the remaining portion of the input beam to the interferometer 2104 for coupling an output thereof to the first detector 2106*a*. The PSD measured at the second detector 2106*b* may be utilized to compensate for source power variations or source noise in the interference signal measured at the first detector 2106*a*.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-21 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A self-referenced spectrometer, comprising:
   an interferometer comprising an input, an output, and at least one optical component, wherein the input is optically coupled to receive an input beam and to direct the input beam along a first optical path to produce a first interfering beam and a second optical path to produce a second interfering beam, wherein the first interfering beam and the second interfering beam are produced prior to the output and exit the interferometer at the output via a same optical component of the at least one optical component;
   an isolation component configured to isolate the first interfering beam from the second interfering beam in the interferometer;
   a detector optically coupled to simultaneously detect a first interference signal produced from the first interfering beam and a second interference signal produced from the second interfering beam, wherein the first interference signal and the second interference signal indicate respective absorbances of light passing through different respective mediums external to the interferometer, wherein the light is associated with the first interfering beam and the second interfering beam; and
   a processor coupled to the detector and configured to process the first interference signal and the second interference signal and to utilize the second interference signal as a reference signal in processing the first interference signal.

2. The spectrometer of claim 1, wherein the interferometer further comprises:
   a beam splitter optically coupled to receive the input beam and to split the input beam into a first incident beam and a second incident beam;
   a fixed reflector optically coupled to receive the first incident beam and to reflect the first incident beam towards the beam splitter to produce a first reflected beam;
   a moveable reflector optically coupled to receive the second incident beam and to reflect the second incident beam towards the beam splitter to produce a second reflected beam; and
   an actuator coupled to the moveable reflector to cause a displacement of the moveable reflector, wherein the displacement produces an optical path length difference between the first reflected beam and the second reflected beam.

3. The spectrometer of claim 2, wherein:
   the beam splitter is further optically coupled to produce the first interfering beam from interference between the first reflected beam and the second reflected beam and to direct the first interfering beam along the first optical path;
   the beam splitter is further optically coupled to produce the second interfering beam from interference between the first reflected beam and the second reflected beam and to direct the second interfering beam along the second optical path; and
   the detector comprises a first detector optically coupled to detect the first interference signal and a second detector optically coupled to detect the second interference signal.

4. The spectrometer of claim 3, wherein:
   the fixed reflector comprises a fixed retro-reflector; and
   the moveable reflector comprises a moveable retro-reflector.

5. The spectrometer of claim 4, wherein:
   the interferometer comprises a Mach-Zehnder interferometer;
   the beam splitter comprises a first beam splitter and a second beam splitter;
   the fixed reflector further comprises a first flat mirror optically coupled to receive the first incident beam from the first beam splitter and to redirect the first incident beam towards the fixed retro-reflector;
   the fixed retro-reflector is optically coupled to direct the first reflected beam towards the second beam splitter;
   the moveable retro-reflector is optically coupled to receive the second incident beam from the first beam splitter;
   the moveable reflector further comprises a second flat mirror optically coupled to receive the second reflected beam from the moveable retro-reflector and to redirect the second reflected beam towards the second beam splitter; and the second beam splitter is optically coupled to receive the first reflected beam and the second reflected beam and to produce the first interfering beam and the second interfering beam.

6. The spectrometer of claim 3, wherein:
the input beam comprises a first input beam comprising a first spectral range and a second input beam comprising a second spectral range different than the first spectral range;
the beam splitter is optically coupled to receive the first input beam and to split the first input beam into a first sub-incident beam and a second sub-incident beam;
the beam splitter is further optically coupled to receive the second input beam and to split the second input beam into a third sub-incident beam and a fourth sub-incident beam;
the fixed reflector is optically coupled to receive the first sub-incident beam and to reflect the first sub-incident beam towards the beam splitter to produce a first sub-reflected beam;
the fixed reflector is further optically coupled to receive the third sub-incident beam and to reflect the third sub-incident beam towards the beam splitter to produce a third sub-reflected beam;
the moveable reflector is optically coupled to receive the second sub-incident beam and to reflect the second sub-incident beam towards the beam splitter to produce a second sub-reflected beam;
the moveable reflector is further optically coupled to receive the fourth sub-incident beam and to reflect the fourth sub-incident beam towards the beam splitter to produce a fourth sub-reflected beam;
the beam splitter is further optically coupled to receive the first sub-reflected beam and the third sub-reflected beam and to produce the first interfering beam from interference between the first sub-reflected beam and the third sub-reflected beam; and
the beam splitter is further optically coupled to receive the second sub-reflected beam and the fourth sub-reflected beam and to produce the second interfering beam from interference between the second sub-reflected beam and the fourth sub-reflected beam.

7. The spectrometer of claim 1, wherein the first optical path comprises a sample arm and the second optical path comprises a reference arm, wherein the sample arm comprises a sample-under-test (SUT).

8. The spectrometer of claim 7, wherein the reference arm comprises a reference material.

9. The spectrometer of claim 8, wherein the reference material comprises a diffuse reflection surface.

10. The spectrometer of claim 9, further comprising:
a micro-electromechanical-mechanical-system (MEMS) chip comprising the interferometer.

11. The spectrometer of claim 10, wherein the reference material comprising the diffuse reflection surface is fabricated within the MEMS chip.

12. The spectrometer of claim 9, wherein the reference material comprises a black silicon reflector.

13. The spectrometer of claim 9, wherein the reference material comprising the diffuse reflection surface is wafer-level bonded to the MEMS chip.

14. The spectrometer of claim 13, wherein the reference material comprises sandblasted glass.

15. The spectrometer of claim 7, wherein the processor is further configured to calculate an absorbance of the SUT based on a ratio of the first interference signal to the second interference signal.

16. The spectrometer of claim 1, wherein:
the second optical path comprises a reference arm, wherein the reference arm comprises a reference material or reference filter; and
the processor is further configured to utilize the second interference signal to determine a wavelength correction amount applied to the first interference signal.

17. The spectrometer of claim 16, further comprising:
a micro-electromechanical-mechanical-system (MEMS) chip comprising the interferometer, wherein the MEMS chip comprises a microfluidic channel containing the reference material.

18. The spectrometer of claim 1, further comprising:
a light source configured to direct a source beam to a sample-under-test (SUT) and a reference material;
wherein the SUT is optically coupled to reflect the source beam to produce a first input beam, and the reference material is optically coupled to reflect the source beam to produce a second input beam, wherein the input beam comprises the first input beam and the second input beam;
wherein the interferometer is optically coupled to receive the first input beam reflected from the SUT and the second input beam reflected from the reference material and to produce the first interfering beam from the first input beam and the second interfering beam from the second input beam.

19. The spectrometer of claim 18, wherein the interferometer comprises a Michelson interferometer or a Fabry-Perot interferometer.

20. The spectrometer of claim 18, wherein the interferometer further comprises:
a beam splitter optically coupled to receive the first input beam and the second input beam and to split the first input beam into a first incident beam and a second incident beam and to split the second input beam into a third incident beam and a fourth incident beam;
a fixed reflector optically coupled to receive the first incident beam and the third incident beam, to reflect the first incident beam towards the beam splitter to produce a first reflected beam, and to reflect the third incident beam towards the beam splitter to produce a third reflected beam; and
a moveable reflector optically coupled to receive the second incident beam and the fourth incident beam, to reflect the second incident beam towards the beam splitter to produce a second reflected beam, and to reflect the fourth incident beam towards the beam splitter to produce a fourth reflected beam;
wherein the beam splitter is further optically coupled to produce the first interfering beam from interference between the first reflected beam and the second reflected beam and to direct the first interfering beam towards the detector;
wherein the beam splitter is further optically coupled to produce the second interfering beam from interference between the third reflected beam and the fourth reflected beam and to direct the second interfering beam to the detector;
wherein the first optical path comprises the first incident beam, the second incident beam, the first reflected beam, the second reflected beam, and the first interfering beam; and
wherein the second optical path comprises the third incident beam, the fourth incident beam, the third reflected beam, the fourth reflected beam, and the second interfering beam.

21. The spectrometer of claim 20, wherein:
the fixed reflector comprises a first fixed reflector optically coupled to receive the first incident beam and a second fixed reflector optically coupled to receive the third incident beam; and
the first fixed reflector is spatially offset from the second fixed reflector with respect to the beam splitter by a distance configured to avoid cross-coupling between the first interference signal and the second interference signal such that the first fixed reflector and the second fixed reflector form the isolation component;
the detector comprises a single detector optically coupled to detect a combined interference signal comprising the first interference signal and the second interference signal; and
a sample interferogram burst of a sample interferogram obtained from the first interference signal is spatially separated from a reference interferogram burst of a reference interferogram obtained from the second interference signal based on the distance.

22. The spectrometer of claim 20, wherein the interferometer further comprises:
a thin film Fabry-Perot slab optically coupled to receive the second input beam and to provide the second input beam to the beam splitter, wherein the isolation component comprises the thin film Fabry-Perot slab.

23. The spectrometer of claim 18, wherein the isolation component comprises a first flat mirror optically coupled to receive the first input beam reflected from the SUT, a second flat mirror optically coupled to receive the second input beam reflected from the reference material, and a reflecting element optically coupled to reflect the first input beam from the first flat mirror to the interferometer and the second input beam from the second flat mirror to the interferometer.

24. The spectrometer of claim 23, wherein the isolation component further comprises a splitter optically coupled to receive the input beam from the wideband light source and to split the input beam into the first input beam directed towards the SUT and the second input beam directed towards the reference material.

25. The spectrometer of claim 24, wherein the isolation component further comprises a first reflective surface optically coupled to receive the first input beam from the splitter and to direct the first input beam towards the SUT and a second reflective surface optically coupled to receive the second input beam from the splitter and to direct the second input beam towards the reference material.

26. The spectrometer of claim 1, further comprising:
a window comprising a sample-under-test (SUT);
a reflective surface coupled to the window;
a source optically coupled to emit a source beam and to direct the source beam to the window and the reflective surface;
wherein the SUT is optically coupled to diffuse reflect a first spectral range of the source beam to produce a first input beam;
wherein the reflective surface is optically coupled to reflect a second spectral range of the source beam to produce a second input beam;
wherein the input beam comprises the first input beam and the second input beam;
wherein the first interference signal comprises the first spectral range and the second interference signal comprises the second spectral range;
wherein the detector is optically coupled to receive a combined interference signal comprising the first interference signal and the second interference signal; and
wherein the processor is further configured to estimate a background signal based on the first interference signal and stored calibration measurements.

27. The spectrometer of claim 26, wherein the window comprises the reflective surface and the reflective surface comprises an anti-reflection coating on the window.

28. The spectrometer of claim 26, wherein the source comprises a first set of light emitters and a second set of light emitters, and further comprising:
a switch controlled by the processor and coupled to the first set of light emitters and the second set of light emitters, wherein the switch is configured to alternately turn on the first set of light emitters and the second set of light emitters.

29. The spectrometer of claim 28, wherein:
the detector is optically coupled to receive a first combined interference signal comprising a first portion of the first interference signal and a first portion of the second interference signal when the first set of light emitters is turned on;
the detector is optically coupled to receive a second combined interference signal comprising a second portion of the first interference signal and a second portion of the second interference signal when the second set of light emitters is turned on; and
the processor is further configured to extract the first interference signal and the second interference signal from the first combined interference signal and the second combined interference signal.

30. The spectrometer of claim 28, wherein the reflective surface comprises a reference diffuse reflectance material.

* * * * *